US012431305B2

(12) United States Patent
Sun et al.

(10) Patent No.: US 12,431,305 B2
(45) **Date of Patent: *Sep. 30, 2025**

(54) POWER MECHANISM, SWITCH, POWER CONVERSION APPARATUS, AND POWER SUPPLY SYSTEM

(71) Applicant: Huawei Digital Power Technologies Co., Ltd., Shenzhen (CN)

(72) Inventors: Jisheng Sun, Shanghai (CN); Jianfei Ma, Shanghai (CN); Xiufeng Zhang, Dongguan (CN); Xiaokang Tian, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 330 days.

This patent is subject to a terminal disclaimer.

(21) Appl. No.: 18/189,267

(22) Filed: Mar. 24, 2023

(65) Prior Publication Data

US 2023/0307197 A1 Sep. 28, 2023

(30) Foreign Application Priority Data

Mar. 24, 2022 (CN) ......................... 202210295906.5

(51) Int. Cl.
*H01H 19/14* (2006.01)
*H01H 19/20* (2006.01)

(52) U.S. Cl.
CPC ............ *H01H 19/14* (2013.01); *H01H 19/20* (2013.01)

(58) Field of Classification Search
CPC .. H02H 3/00; H02H 3/02; H02H 3/06; H02H 3/08; H01H 71/00; H01H 71/0271; H01H 71/1009; H01H 71/10; H01H 71/1018; H01H 71/1027; H01H 71/1045; H01H 71/1054; H01H 71/12; H01H 71/56; H01H 2003/1032; H01H 2003/46;
(Continued)

(56) References Cited

U.S. PATENT DOCUMENTS 8,093,965 B2 * 1/2012 Mittelstadt ......... H01H 71/0207 335/8
8,149,075 B2 4/2012 Navarre et al.
2002/0158732 A1 * 10/2002 Castonguay ......... H01H 71/126 335/172

FOREIGN PATENT DOCUMENTS

CN 101395685 A 3/2009
CN 203931860 U 11/2014
CN 113921354 A 1/2022

* cited by examiner

*Primary Examiner* — Anthony R Jimenez
(74) *Attorney, Agent, or Firm* — Maier & Maier, PLLC

(57) ABSTRACT

A power mechanism, a switch, a power conversion apparatus, and a power supply system. The switch includes a contact component, a knob, and a power mechanism connected between the contact component and the knob. The power mechanism includes a fastening bracket, a knob connector, a contact connector, a transmission component, a trip unit, and a cradle. Both the knob connector and the contact connector are rotatively connected to the fastening bracket, and rotation centers of the knob connector and the contact connector are collinear. The transmission component is configured to implement power transmission between the knob connector and the contact connector. The trip unit is configured to receive a switch-off signal, to implement tripping of the trip unit and the cradle. The transmission component is driven to move by using the cradle, to separate the movable contact from the static contact, so that the switch is switched off.

20 Claims, 21 Drawing Sheets

(58) Field of Classification Search
CPC ......... H01H 2221/00; H01H 2221/024; H01H 2221/03; H01H 19/00; H01H 19/02; H01H 19/10; H01H 19/14; H01H 19/20; H01H 83/00; H01H 83/10; H01H 83/20; H01H 13/50; H01H 13/503; H01H 13/506; H01H 3/00; H01H 3/02; H01H 3/04; H01H 3/10; H01H 3/32
USPC .......................................................... 200/336
See application file for complete search history.

POWER MECHANISM, SWITCH, POWER CONVERSION APPARATUS, AND POWER SUPPLY SYSTEM

CROSS-REFERENCE TO RELATED APPLICATION

This application claims priority to Chinese Patent Application No. 202210295906.5, filed on Mar. 24, 2022, which is hereby incorporated by reference in its entirety.

TECHNICAL FIELD

The embodiments relate to the field of power supply system technologies, a power mechanism, a switch, a power conversion apparatus, and a power supply system that are applied to a switch of a power supply system.

BACKGROUND

A switch is widely used in a power supply system. By controlling switch-on or switch-off of the switch, a circuit can be connected or disconnected. As the power supply system has more functions and higher security requirements, in an electronic device such as a power conversion apparatus, a switch is disposed to implement manual connection or disconnection of a circuit or automatic tripping. A switch with a compact structure and a small size may be part of research and development processes of the power supply system.

SUMMARY

The embodiments may provide a power mechanism, a switch, a power conversion apparatus, and a power supply system. The power mechanism of the switch may have a small size, which can reduce space of an electronic device.

According to a first aspect, an embodiment may provide a power supply system, including a control unit, a switch, a direct current source, and a power conversion unit. The switch is electrically connected between the direct current source and the power conversion unit, and the control unit is configured to send a switch-off signal to the switch when the direct current source or the power conversion unit is faulty. The switch includes a contact component, a knob, and a power mechanism connected between the contact component and the knob, and the contact component includes a movable contact and a static contact that can be switched on or off relative to each other. The power mechanism includes a fastening bracket, a knob connector, a contact connector, a transmission component, a trip unit, and a cradle. The knob connector is fastened to the knob, the contact connector is fastened to the movable contact, both the knob connector and the contact connector are rotatively connected to the fastening bracket, and rotation centers of the knob connector and the contact connector are collinear. The transmission component is configured to implement power transmission between the knob connector and the contact connector, the cradle is rotatively connected to the fastening bracket, the cradle is connected to the transmission component, the cradle cooperates with the trip unit, and the trip unit is configured to receive the switch-off signal, to implement tripping of the trip unit and the cradle. The transmission component is driven to move by using the cradle, to separate the movable contact from the static contact, so that the switch is switched off.

Both the knob connector and the contact connector may be rotated to the fastening bracket and the rotation centers of the knob connector and the contact connector may be collinear, so that an overall structure of the power mechanism can be compact and space can be reduced. This facilitates a small size of the switch and reduces space of the power supply system.

In a possible implementation, the transmission component includes a first linkage structure, a second linkage structure, and a transmission element. The transmission element is rotatively connected to the fastening bracket, the first linkage structure is connected between the transmission element and the knob connector, to drive, by rotating the knob, the transmission element to rotate relative to the fastening bracket, and the second linkage structure is connected between the transmission element and the contact connector, to drive, by rotating the transmission element relative to the fastening bracket, the movable contact to move. This solution provides an architecture of the transmission component. The first linkage structure and the second linkage structure that are independent of each other are respectively used as transmission structures between the knob and the transmission element and between the transmission element and the movable contact, to implement switch-on or switch-off of the switch. A structure may be simple, compact, and easy to operate.

In a possible implementation, the fastening bracket includes a bracket body and a main shaft fastened to the bracket body. The knob connector is rotatively connected to one end of the main shaft, and the contact connector is rotatively connected to the other end of the main shaft. In an axial direction of the main shaft, the contact connector, the bracket body, and the knob connector are sequentially arranged, and a rotation center of the knob connector and a rotation center of the contact connector are both located on a central axis of the main shaft.

Because of the coaxial and collinear structure of the knob connector and the contact connector of the power mechanism, the first linkage structure and the second linkage structure may be assembled on a same rotation shaft, and the knob connector and the contact connector may also be assembled on a same rotation shaft. This makes an overall structure of the power mechanism more compact, so that the power mechanism can be arranged in small space, which helps implement miniaturization of the switch. In addition, the switch may be more secure. When fusion welding occurs between the movable contact and the static contact, in a normal manual switch-off process, the knob cannot drive the movable contact to move by rotating to a preset position. In this case, the knob may continue to be rotated, so that the first rotation structure of the first linkage structure comes in contact with and pushes the second rotation structure of the second linkage structure. The movable contact may be forced to leave the static contact, to implement switch-off by using rotary torque between the first rotation structure and the second rotation structure (the rotary torque is greater than connection force generated by fusion welding between the movable contact and the static contact).

In a possible implementation, the bracket body includes a first plate and a second plate that are disposed opposite to each other. The main shaft passes through the first plate and the second plate, the knob connector is rotatively connected to one end of the main shaft, the contact connector is rotatively connected to the other end of the main shaft, a part of the first linkage structure is located between the first plate and the second plate, is sleeved on a periphery of the main shaft, is rotatively connected to the fastening bracket, and is fastened to the knob connector. In this solution, the knob connector, the contact connector, and the part of the first linkage structure are coaxially assembled by using the main shaft. This helps implement a simple and compact overall structure of the power mechanism.

In a possible implementation, the first linkage structure includes a first rotation structure. The first rotation structure includes a first part and a second part that are oppositely spaced and fastened to each other. The first part is sleeved on the periphery of the main shaft and adjacent to the first plate, the first part is fastened to the knob connector, and the second part is sleeved on the periphery of the main shaft and adjacent to the second plate. An area between the first part and the second part is configured to accommodate a part of the second linkage structure, and the first rotation structure is movably connected to the transmission element, to drive, by rotating the knob, the transmission element to rotate relative to the fastening bracket. In this solution, force is transferred among the transmission element, the knob, a rotation shaft through the movable connection between the first rotation structure and the transmission element. A structure in which the first rotation structure of the first linkage structure may be first part and the second part and both the first part and the second part may be rotatively connected to the main shaft helps implement a compact structure of the transmission component and has an advantage of space reduction.

In a possible implementation, the first linkage structure includes a first connecting rod structure, the first rotation structure is movably connected to the transmission element by using the first connecting rod structure, one end of the first connecting rod structure is rotatively connected to the first rotation structure, and the other end of the first connecting rod structure is rotatively connected to the transmission element. In this solution, the first connecting rod structure is connected to the first rotation structure and the transmission element, to implement a connection solution between the knob connector and the transmission element, which has advantages of space reducing and motion stability.

In a possible implementation, the transmission element includes a first arm, a second arm, and an intermediate arm. The first arm and the second arm are oppositely spaced, and the intermediate arm is fastened between the first arm and the second arm. The first arm is rotatively connected to the first plate, the second arm is rotatively connected to the second plate, and the intermediate arm is configured to connect to the second linkage structure by using an elastic element. The first connecting rod structure includes a first rod and a second rod. The first rod and the second rod are oppositely spaced and fastened, one end of the first rod is rotatively connected to the first part, the other end of the first rod is rotatively connected to the first arm, one end of the second rod is rotatively connected to the second part, and the other end of the second rod is rotatively connected to the second arm. In this solution, an architecture of the first connecting rod structure may be limited, force of the first rotation structure may be transferred to the first arm by using the first rod, and the force of the first rotation structure may be transferred to the second arm by using the second rod. For the transmission element, the first arm and the second arm may be simultaneously thrust by the first linkage structure. This may have advantages of force balance and good stability.

In a possible implementation, the first arm includes a first main arm and a first branch arm. The first main arm is rotatively connected to the first plate, one end of the first branch arm is fastened to the first main arm, and the other end of the first branch arm is rotatively connected to the first rod. The second arm includes a second main arm and a second branch arm. The second main arm is rotatively connected to the second plate, one end of the second branch arm is fastened to the second main arm, and the other end of the second branch arm is rotatively connected to the second rod. The first branch arm is located on an outer side the first plate, and the second branch arm is located on an outer side of the second plate. In this solution, architectures of the first arm and the second arm of the transmission element may be limited. Based on force balancing, this solution helps implement a small size.

In a possible implementation, a part that is of the first main arm and that is rotatively connected to the first plate is located on an inner side of the first plate, and a part that is of the second main arm and that is rotatively connected to the second plate is located on an inner side of the second plate. In this solution, a position relationship when the first main arm and the second main arm are respectively rotatively connected to the first plate and the second plate is limited, so that a connection structure between the transmission element and the fastening bracket does not occupy space, and the structure is compact.

In a possible implementation, the transmission element includes a first arm, a second arm, and an intermediate arm, the first arm and the second arm are oppositely spaced, the intermediate arm is fastened between the first arm and the second arm, the first arm is rotatively connected to the first plate, the second arm is rotatively connected to the second plate, and the intermediate arm is configured to rotatively connect to the first linkage structure. In this solution, the intermediate arm is connected to the first connecting rod structure, and no connection structure needs to be disposed on the first arm and the second arm, so that an overall structure of the power mechanism is compact, and a size may be smaller. In addition, reliability of a structure of the transmission element can also be easily implemented by using the intermediate arm under force. For example, a size and a form of the intermediate arm may be controlled, to ensure reliability of a connection between the transmission element and the first connecting rod structure.

In a possible implementation, the intermediate arm includes an intermediate body and an intermediate connecting rod, the intermediate body and the intermediate connecting rod are fastened to form an integrated structure, and one end that is of the intermediate connecting rod and that is away from the intermediate body is rotatively connected to the first connecting rod structure. This solution defines a structure of the intermediate arm. Compared with the intermediate body, the intermediate connecting rod may be a thin rod structure, and a position of the intermediate connecting rod may be located in a central area of a vertical line between the first plate and the first plate.

In a possible implementation, the part of the second linkage structure is located between the first plate and the second plate, is located between the first part and the second part, is rotatively connected to the main shaft, and is fastened to the contact connector. In this solution, a position relationship between the part of the second linkage structure and the first part and the second part of the first rotation structure on the main shaft may be limited, so that both the first linkage structure and the second linkage structure are assembled on the main shaft. This helps assembly, implements a simple assembly process ensures precision, and can implement a compact structure of an overall power mechanism and a small-size.

In a possible implementation, the second linkage structure includes a second rotation structure and a second connecting rod structure. The second rotation structure includes an intermediate sleeve and a first bump and a second bump that are protrudingly disposed on an outer surface of the intermediate sleeve. The intermediate sleeve is sleeved on the main shaft and is located between the first part and the second part, and the first bump and the contact connector are fastened by using a fastened pin. The fastened pin and an outer side surface of the second part of the first rotation structure are disposed at an interval, and the outer side surface is a surface that is of the second part and that is away from the main shaft in a radial direction of the main shaft. The second bump is rotatively connected to one end of the second connecting rod structure, and the second connecting rod structure is located between the first plate and the second plate and is configured to connect to the transmission element. This solution defines a solution of the second linkage structure. By setting a position of the fastened pin, on one hand, it can be ensured that the first linkage structure and the second linkage structure can move independently of each other, and on the other side, force may be applied to the second rotation structure of the second linkage structure by rotating the first rotation structure of the first linkage structure, so that the knob may continue to be rotated when fusion welding occurs between the movable contact and the static contact. In this way, the first rotation structure of the first linkage structure comes in contact with and pushes the second rotation structure of the second linkage structure. The movable contact may be forced to leave the static contact, to implement switch-off by using abutting force between the first rotation structure and the second rotation structure (the abutting force is greater than connection force generated by fusion welding between the movable contact and the static contact).

In a possible implementation, the first rotation structure is slidingly connected to the transmission element, to drive, by rotating the knob, the transmission element to rotate relative to the fastening bracket. In this solution, force is transferred between the first rotation structure and the transmission element in a sliding connection manner, so that advantages of a compact structure and a small size can also be implemented.

In a possible implementation, the transmission element includes a first arm, a first extension part, a second arm, a second extension part, and an intermediate arm. The first arm and the second arm are oppositely spaced, and the intermediate arm is fastened between the first arm and the second arm. The first arm is rotatively connected to the first plate, the second arm is rotatively connected to the second plate, and the intermediate arm is configured to connect to the second linkage structure by using an elastic element. One end of the first extension part is fastened to the first arm, and the other end of the first extension part is located on a side that is of the first part of the first rotation structure and that is away from the second part of the first rotation structure, and is slidingly connected to the first rotation structure. One end of the second extension part is fastened to the second arm, and the other end of the second extension part is located on a side that is of the second part of the first rotation structure and that is away from the first part of the first rotation structure, and is slidingly connected to the first rotation structure. In this solution, a sliding connection transmission element may be limited. The first linkage structure has a simple structure, and force transmission between the first rotation structure and the transmission element can be implemented only through sliding cooperation, which has an advantage of a compact structure.

In a possible implementation, the first rotation structure includes a sliding rod. The sliding rod is fastened to the first part and the second part, and the sliding rod includes a first sliding part and a second sliding part. The first sliding part is located on a side that is of the first part and that is away from the second part, and the second sliding part is located on a side that is of the second part and that is away from the first part. A first sliding slot is disposed on the first extension part, the first sliding slot cooperates with the first sliding part, a second sliding slot is disposed on the second extension part, and the second sliding slot cooperates with the second sliding part, to implement a sliding connection between the first rotation structure and the transmission element. This solution defines a sliding connection solution. Through cooperation between a sliding rod and a sliding slot, a form of the sliding slot may be based on a requirement, to limit a sliding track of the sliding rod in the sliding slot. A structure of this solution may also have an advantage of a compact structure.

In a possible implementation, the switch has three states: a manual switch-off state, a manual switch-on state, and an automatic tripping state. The knob points to a first position when the switch is in the manual switch-on state, the knob points to a second position when the switch is in the manual switch-off state, and the knob points to a third position when the switch is in the automatic tripping state. An angle at which the knob rotates between the third position and the first position is greater than or equal to a preset value, and an angle at which the knob rotates between the third position and the second position is also greater than or equal to the preset value. In this solution, a large angle indication of the knob is limited, which is easy to identify, facilitates observation of a switch status, and easily detects problems such as a slight fusion welding and a switch-off failure of a contact.

The preset value may be greater than or equal to 20 degrees, or greater than or equal to 30 degrees. In an implementation, the preset value may be from 40 degrees to 50 degrees.

According to a second aspect, an implementation may provide a power mechanism, applied to a switch, and configured to drive a movable contact and a static contact of the switch to be switched on or off. The power mechanism includes a fastening bracket, a knob connector, a contact connector, a transmission element, a first linkage structure, and a second linkage structure. The knob connector, the contact connector, and the transmission element are all rotatively connected to the fastening bracket, the knob connector is configured to fasten a knob, the contact connector is configured to fasten the movable contact, a rotation center of the knob connector is a first axis, a rotation center of the contact connector is a second axis, and the first axis and the second axis are collinear. The first linkage structure is connected between the transmission element and the knob connector, to drive, by rotating the knob, the transmission element to rotate relative to the fastening bracket. The second linkage structure is connected between the transmission element and the contact connector, to drive, by rotating the transmission element relative to the fastening bracket, the movable contact to move.

In a possible implementation, the fastening bracket includes a bracket body and a main shaft fastened to the bracket body. The knob connector is rotatively connected to one end of the main shaft, and the contact connector is rotatively connected to the other end of the main shaft. In an axial direction of the main shaft, the contact connector, the bracket body, and the knob connector are sequentially arranged, and both the first axis and the second axis are located on a central axis of the main shaft.

The power mechanism may have a compact structure and a small size. Because of the coaxial and collinear structure of the knob connector and the contact connector of the power mechanism, the first linkage structure and the second linkage structure may be assembled on a same rotation shaft, and the knob connector and the contact connector may also be assembled on a same rotation shaft. This makes an overall structure of the power mechanism more compact, so that the power mechanism can be arranged in small space, which helps implement miniaturization of the switch.

In addition, the switch is more secure by using the solution of the power mechanism provided in the embodiments. When fusion welding occurs between the movable contact and the static contact, in a normal manual switch-off process, the knob cannot drive the movable contact to move by rotating to a preset position. In this case, the knob may continue to be rotated, so that the first rotation structure of the first linkage structure comes in contact with and pushes the second rotation structure of the second linkage structure. The movable contact may be forced to leave the static contact, to implement switch-off by using abutting force between the first rotation structure and the second rotation structure (the abutting force is greater than connection force generated by fusion welding between the movable contact and the static contact).

For other possible implementations of the second aspect, refer to the possible implementations of the first aspect.

According to a third aspect, an implementation may provide a switch, including a contact component, a knob, and the power mechanism according to any one of the possible implementations of the first aspect. The contact component includes a movable contact and a static contact, and the power mechanism is connected between the knob and the movable contact, and is configured to drive the movable contact and the static contact to be switched on or off.

According to a fourth aspect, an implementation may provide a power conversion apparatus, including a circuit board and the switch according to the third aspect. The contact component is disposed on the circuit board.

According to a fifth aspect, an implementation may provide a power supply system, including a direct current source, a power conversion unit, and the switch according to the third aspect. The switch is connected between the direct current source and the power conversion unit.

BRIEF DESCRIPTION OF THE DRAWINGS

To describe the embodiments or the background further, the following describes the accompanying drawings.

DETAILED DESCRIPTION OF THE EMBODIMENTS

The following describes the embodiments with reference to the accompanying drawings.

Figure 1:
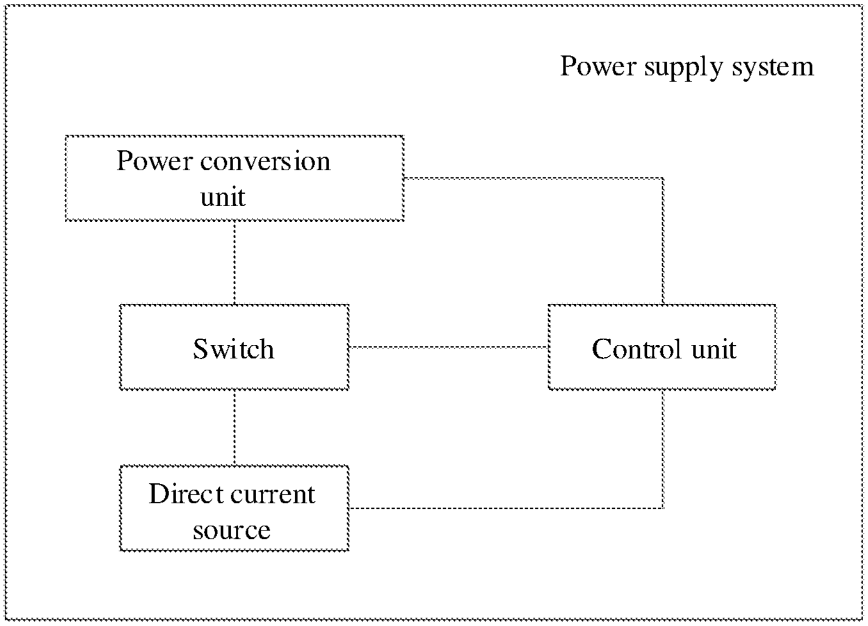
FIG. 1 is a schematic diagram of a power supply system according to an implementation.

Referring to FIG. 1, an implementation may provide a power supply system and a switch applied to the power supply system. The power supply system includes a control unit, a switch, a direct current source, and a power conversion unit. The switch is electrically connected between the direct current source and the power conversion unit, and the control unit is configured to send a switch-off signal to the switch when the direct current source or the power conversion unit is faulty. The direct current source may be a photovoltaic component, a photovoltaic string, or a series-parallel circuit between a photovoltaic component and a photovoltaic string. The direct current source may alternatively be a power conversion unit. The power conversion unit may be a DC/DC converter or a DC/AC converter. Both the direct current source and the power conversion unit may be considered as power supply circuits. When a power supply circuit is faulty, for example, if the direct current source or the power conversion unit is faulty, the control unit detects occurrence of the fault, and the control unit can send a switch-off signal to the switch, where the switch-off signal is used to trigger (that is, drive) the switch to be switched off and disconnect the circuit.

In an implementation, the control unit may be an independent controller. The controller is disposed in the power supply system and is independent of the direct current source and the power conversion unit, and is electrically connected to the power conversion unit, the direct current source, and the switch through a signal cable. In an implementation, the power conversion unit may be an independent power conversion apparatus, for example, an inverter. In an implementation, the control unit may alternatively be integrated into another functional apparatus. For example, the control unit may be integrated into an inverter, and may be a control circuit or a control chip on a main board in the inverter. In this way, as an independent apparatus, the power conversion apparatus may have a function of free tripping in any scenario, that is, automatic tripping when a circuit is faulty.

Figure 2:
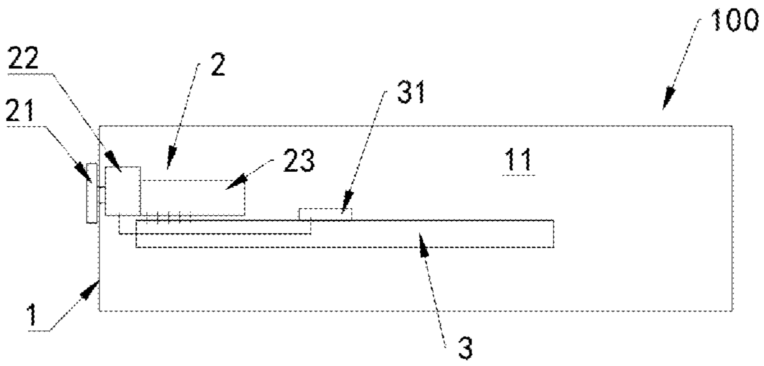
FIG. 2 is a schematic diagram of a power conversion apparatus according to an implementation.

The switch may be an independent switch component disposed in the power supply system, or the switch may be disposed on a functional apparatus in the power supply system. For example, in an implementation, the switch is disposed on the power conversion apparatus. As shown in FIG. 2, the power conversion apparatus 100 includes a housing 1, a switch 2, and a circuit board 3. The housing 1 is surrounded by an accommodation space 11, the circuit board 3 is disposed in the accommodation space 11, and the switch 2 includes a knob 21, a power mechanism 22, and a contact component 23. The contact component 23 and the power mechanism 22 are located in the accommodation space and are electrically connected to the circuit board 3, and the knob 21 is located on one side of an outer surface of the housing 1. In an implementation, a control unit 31 is disposed on the circuit board 3, the control unit 31 is electrically connected to the power mechanism 22, and the control unit 31 is configured to send a switch-off signal to the power mechanism 22, so that the power mechanism 22 can drive the contact component 23 to be switched off.

Figure 3:
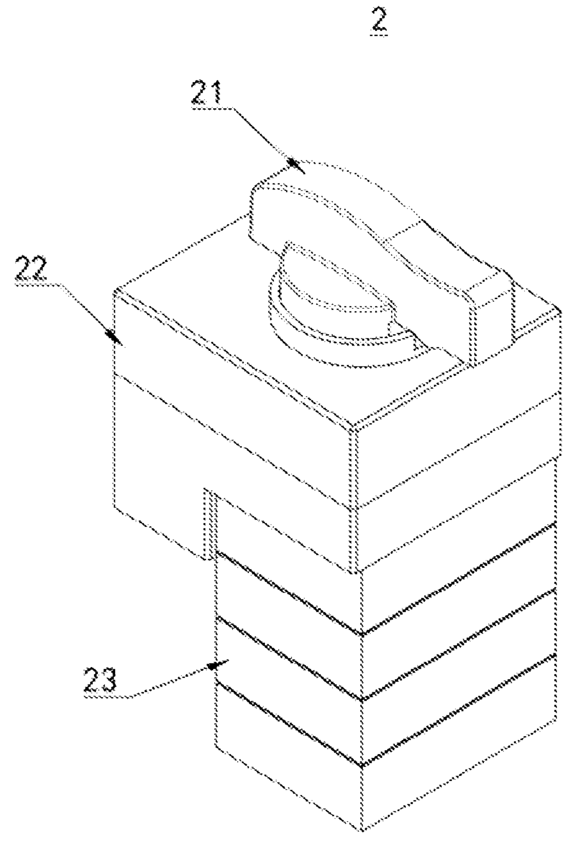
FIG. 3 is a schematic diagram of a switch according to an implementation.
Figure 4:
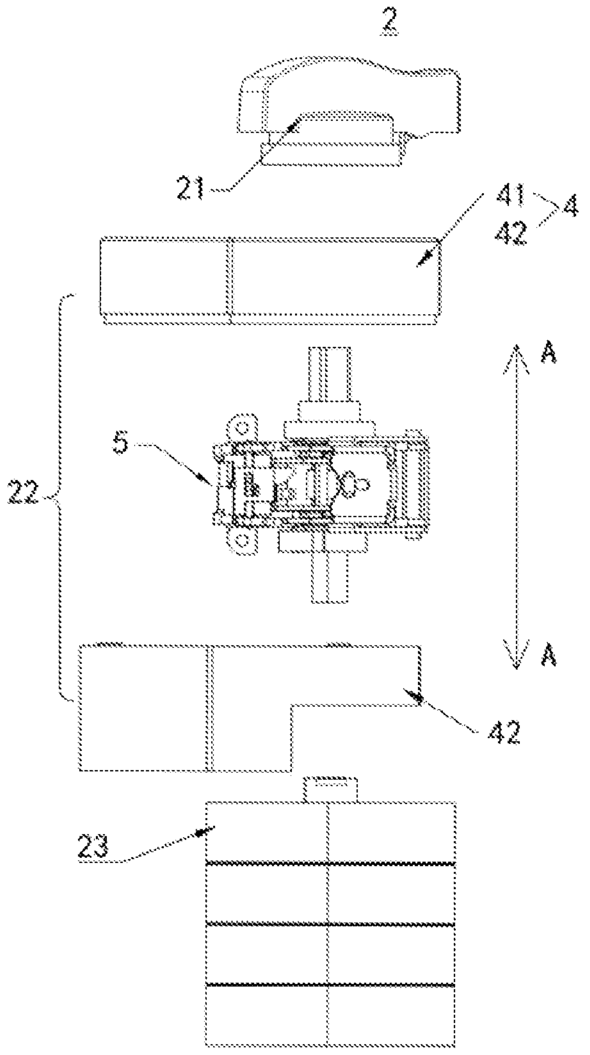
FIG. 4 is an exploded view of a switch according to an implementation.

FIG. 3 is a three-dimensional schematic diagram of a switch 2 according to an implementation, and FIG. 4 is an exploded view of the switch 2 according to an implementation. Referring to FIG. 3 and FIG. 4, the switch 2 includes a knob 21, a power mechanism 22, and a contact component 23. The power mechanism 22 is disposed between the knob 21 and the contact component 23 in a laminated manner along a first direction A. The power mechanism 22 includes a cover body 4 and a linkage apparatus 5 accommodated in the cover body 4. The cover body 4 includes an upper cover 41 and a lower cover 42. The upper cover 41 and the lower cover 42 are fastened to each other and jointly encircle the linkage apparatus 5. The linkage apparatus 5 includes a knob connector S1 and a contact connector S2. In an implementation, the knob connector S1 extends out of the cover body 4 from the upper cover 41, and the knob connector S1 is configured to be fastened to the knob 21. In another implementation, the knob connector S1 may alternatively be located inside the cover body 4, and does not extend out of the cover body 4. The knob 21 extends into the cover body 4 from an outside of the cover body 4, and is fastened to the knob connector S1. The knob connector S1 can rotate relative to the cover body 4, and an axial extension direction of the knob connector S1 is the first direction A. In an implementation, the contact connector S2 extends out of the cover body 4 from the lower cover 42, and the contact connector S2 is configured to be fastened to the contact component 23. In other implementations, the contact connector S2 may alternatively be located inside the cover body 4, and does not extend out of the cover body 4. The contact component 23 extends into the cover body 4 and is fastened to the contact connector S2. An extension direction of a rotation center of the contact connector S2 is the first direction A. A rotation center of the knob connector S1 and the rotation center of the contact connector S2 are collinear. The knob connector S1 and the contact connector S2 are assembled on a same shaft. Referring to FIG. 2 and FIG. 4, in a state in which the switch 2 is assembled in the housing 1 of the power conversion apparatus 100, the power mechanism 22 and the contact component 23 are accommodated in the housing 1, and a surface that is of the power mechanism 22 and that is away from the contact component 23 may be in contact with an inner surface of the housing 1. A through hole is disposed on the housing 1, the knob connector S1 on the power mechanism 22 extends out of the through hole, and the knob 21 is installed on the knob connector S1 from one side of an outer surface of the housing 1.

In an implementation, extension directions of the contact connector S2 and the knob connector S1 are the same, and rotation centers of the contact connector S2 and the knob connector S1 are coaxial and collinear. The contact connector is driven to rotate by rotating the knob. A rotation direction of the knob may be the same as a rotation direction of the contact connector. Because a movable contact is inside the switch and cannot be visually observed, a rotation direction of the movable contact may be intuitively understood by using the knob connector. This can bring good experience for a user. In addition, because of the coaxial and collinear structure of the rotation centers of the contact connector S2 and the knob connector S1, a structure of the power mechanism 22 between the knob and the movable contact is compact, so that a small-size of the switch is easily implemented.

Figure 5:
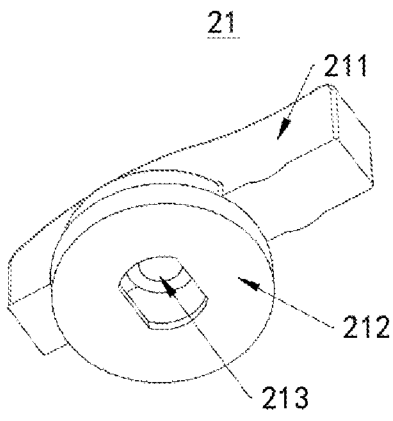
FIG. 5 is a schematic diagram of a knob of a switch according to an implementation.

With reference to FIG. 3 and FIG. 5, in an implementation, the knob 21 includes a handle 211 and a base body 212. The base body 212 is configured to connect the power mechanism 22 and the knob connector S1, the handle 211 is connected to a side that is of the base body 212 and that is away from the cover body 4 of the power mechanism 22, and the handle 211 is configured to provide a manual operation for a user and indicate a state of the switch (a switch-on state, a switch-off state, and a fault state). As shown in FIG. 5, a mounting hole 213 is disposed on a surface that is of the base body 212 and that faces the power mechanism 22, and the knob connector S1 of the power mechanism 22 extends out of the housing of the power conversion apparatus and is fastened to the mounting hole 213. The mounting hole 213 is located at a central position of the base body 212. The base body 212 may be a flat cylinder. The first direction A is an axial position of the base body 212. Along a radial direction of the base body 212, the handle 211 extends in a strip shape and extends out of an outer edge of the base body 212.

Figure 6:
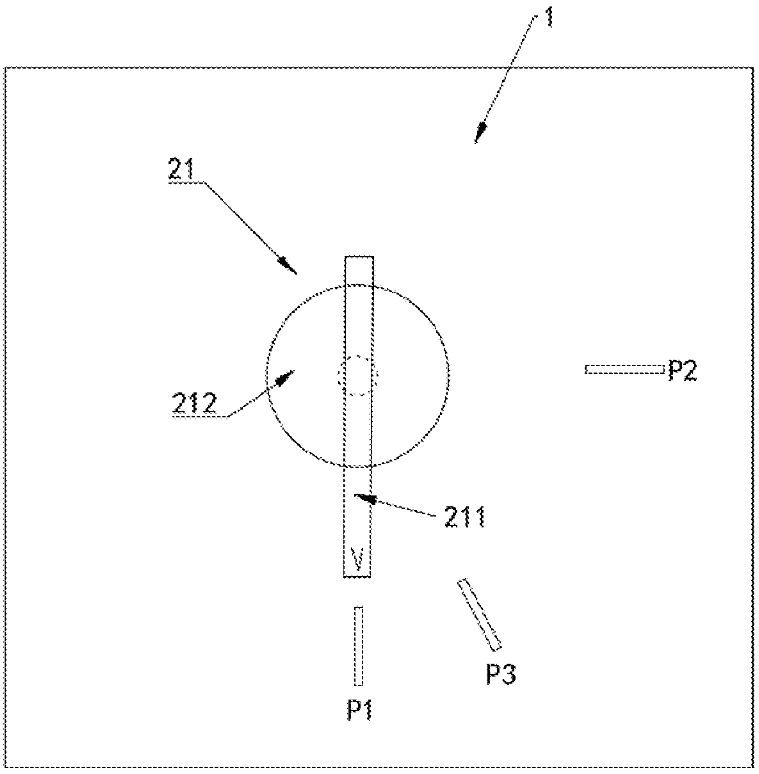
FIG. 6 is a schematic diagram of an outer surface of a knob of a switch and a housing of a power conversion apparatus according to an implementation.

In an implementation, a rotation angle of the knob 21 is 90 degrees, and the rotation angle of 90 degrees conforms to a conventional operation habit and can provide good experience for a user. As shown in FIG. 6, in an implementation, on one side of the outer surface of the housing 1 of the power conversion apparatus, three positions are disposed around the knob 21: a first position P1, a second position P2, and a third position P3. The central position of the base body 212 is used as a circle center, an included angle between a radial direction of the first position P1 and a radial direction of the second position P2 is 90 degrees, and the third position P3 is between the first position P1 and the second position P2. When the switch is in a manual switch-on state, the knob 21 is located at the first position P1 (in this state, an edge of the handle 211 may point to the first position P1). When the switch is in a manual switch-off state, the knob 21 is located at the second position P2 (in this state, an edge of the handle 211 may point to the second position P2). When the circuit is faulty, the switch is in a tripping state, and the knob is located at the third position P3 (in this state, an edge of the handle 211 may point to the third position P3). An identifier similar to an arrow may be disposed on an outer surface of the handle 211 and a state of the switch may be indicated by using a correspondence between the arrow and the first position P1, the second position P2, and the third position P3. An angle at which the knob rotates between the first position P1 and the second position P2 is 90 degrees (which may also be understood as close to 90 degrees, and "close to 90 degrees" may be understood as a range of about 90 degrees, for example, a range from 75 degrees to 105 degrees (including 75 degrees and 105 degrees)), an angle at which the knob rotates between the third position P3 and the first position P1 is greater than or equal to a preset value, and an angle at which the knob rotates between the third position P3 and the second position P2 is also greater than or equal to the preset value. A purpose of setting the preset value herein is to meet that the third position P3 and the first position P1 are easily distinguished by naked eyes, and the third position P3 and the second position P2 are easily distinguished by naked eyes. That is, when the switch is in the tripping state (the Trip state), the third position P3 indicated by the knob is easily identified. The preset value may be greater than or equal to 20 degrees, or greater than or equal to 30 degrees. In an implementation, the preset value may be from 40 degrees to 50 degrees. The knob of the switch rotates at a large angle, so that a state of the switch may be easily identified by naked eyes. Additionally, in an automatic tripping state, the knob is also located at an apparent position, and therefore a state of the switch may be easily identified.

Figure 7:
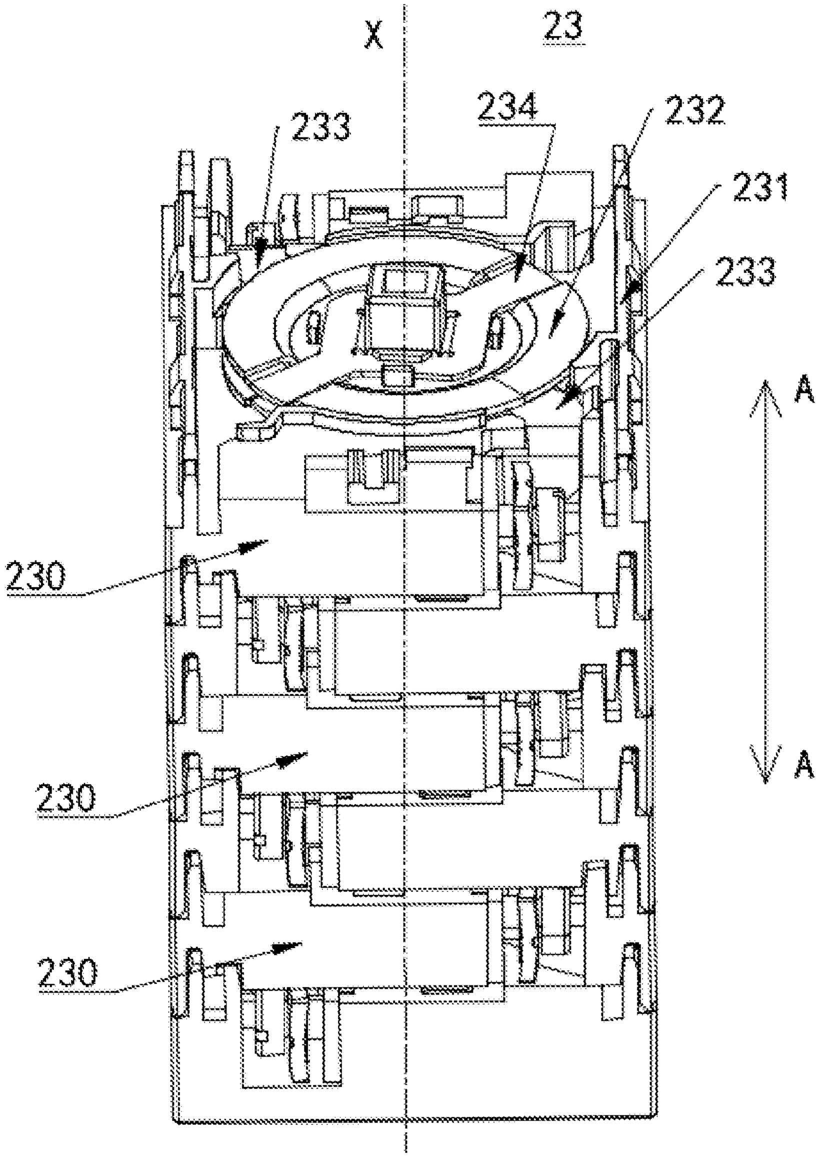
FIG. 7 is a schematic diagram of a contact component of a switch according to an implementation.

Referring to FIG. 7, the contact component 23 includes a plurality of contact units 230 disposed in a laminated manner along the first direction A, and the plurality of contact units 230 are sequentially laminated and spliced together to form a whole. For each contact unit 230, the contact unit 230 includes a fastening part 231 and a movable part 232, the movable part 232 is rotatively connected to the fastening part 231, the fastening part 231 is provided with a static contact 233, and the movable part 232 is provided with a movable contact 234. The movable part 232 has a central axis X, the central axis X extends along the first direction A, and the movable part 232 can rotate by using the central axis X as a center, so that the movable contact 234 and the static contact 233 are switched on or off. In this implementation, the static contact 233 is in a static state, and the movable contact 234 is movable. In another implementation, the switch-on or switch-off may alternatively be implemented between the movable contact and the static contact in a relative movement relationship. For example, the movable contact may move, and the static contact may also move. However, there is a relative displacement between the movable contact and the static contact, and the switch-on or switch-off is implemented through the relative displacement. Therefore, the static contact may not be limited as absolutely static and "static" in the static contact may be defined relative to the movable contact. As long as there is a relative displacement between the static contact and the movable contact, the static contact is allowed to move.

Figure 8:
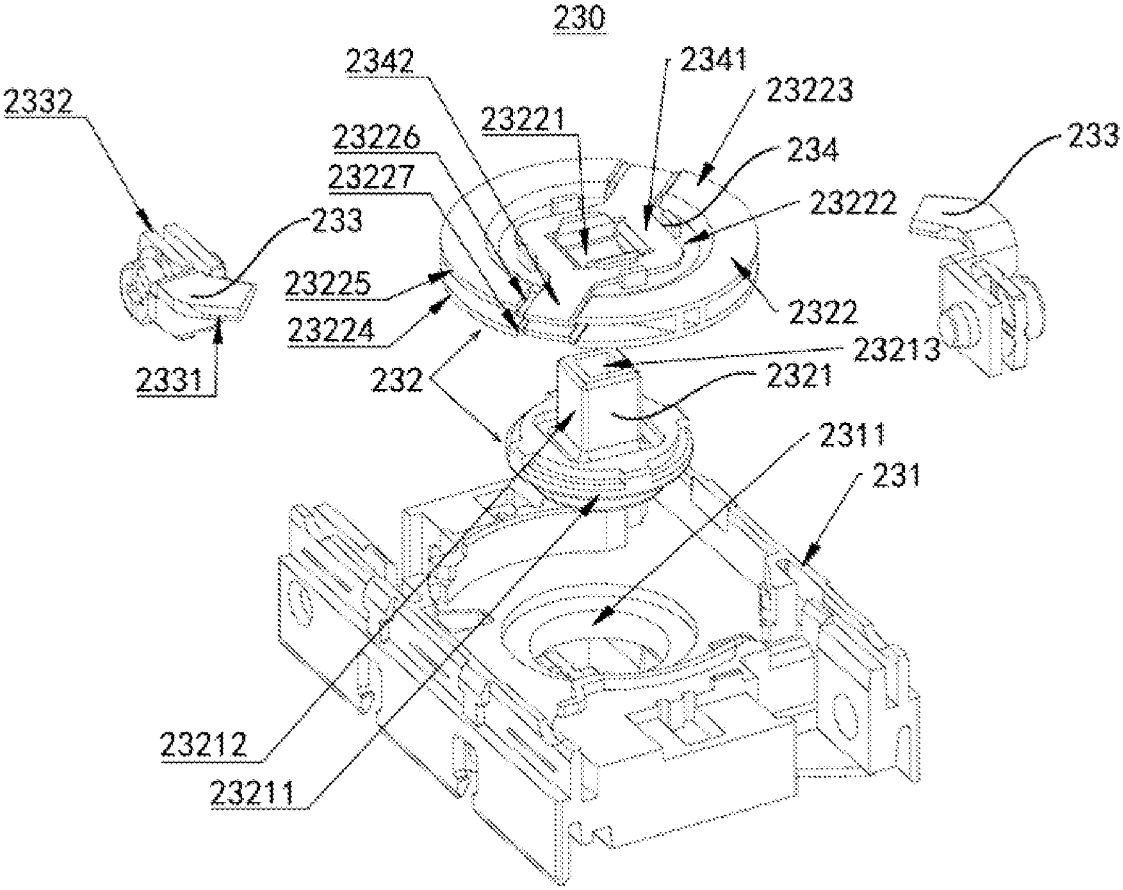
FIG. 8 is an exploded view of a contact unit in a contact component of a switch according to an implementation.

FIG. 8 is an exploded view of a contact unit 230. The fastening part 231 may be understood as a square base architecture. A central through hole 2311 is disposed at a central position of the fastening part 231. The static contact 233 is installed at an edge position of the fastening part 231, and the static contact 233 is fastened to the fastening part 231, which may be fastened by using a fastener or a screw. In an implementation, there are two static contacts 233. In a circumferential direction, the two static contacts 233 are symmetrically distributed on a periphery of the central through hole 2311, and the two static contacts 233 are disposed on the periphery of the central through hole 2311 in a manner of 180-degree rotation and symmetrical distribution. The static contact 233 includes an inner connecting part 2331 facing the central through hole 2311 and an outer connecting part 2332 located between an outer edge of the fastening part 231 and the inner connecting part 2331. The inner connecting part 2331 is of a sheet structure, and the inner connecting part 2331 is configured to cooperate with the movable contact 234 to implement circuit connection. The outer connecting part 2332 is configured to electrically connect to a circuit board of the power conversion apparatus. The outer connecting part 2332 is configured to connect a wire, one end of the wire is electrically connected to the outer connecting part 2332, and the other end of the wire is electrically connected to the circuit board.

The movable part 232 is rotatively connected to a position of the central through hole 2311 of the fastening part 231. The movable part 232 includes a first rotation element 2321 and a second rotation element 2322. The first rotation element 2321 includes a base 23211 and a coupling structure 23212. The movable part 232 is a centrosymmetric structure, and a central axis of the movable part 232 is a central axis of the coupling structure 23212. The coupling structure 23212 is fastened to the base 23211 and is protrudingly disposed on a surface of the base 23211. The base 23211 is configured to cooperate with the central through hole 2311 of the fastening part 231. The base 23211 is rotatively connected to the fastening part 231. A size of a radial periphery of the base 23211 matches with a size of the central through hole 2311, so that the base 23211 is rotatively installed inside the central through hole 2311, and can rotate in the central through hole 2311 by using a central axis of the movable part 232 as a rotation center. On the surface of the base 23211, a protruding extension direction of the coupling structure 23212 is the first direction, and an extension direction of the central axis of the movable part 232 is also the first direction. The coupling structure 23212 in the contact unit 230 adjacent to the power mechanism 22 is configured to be fastened to the contact connector S2 of the power mechanism 22 and coupling structures 23212 of other contact units 230 are configured to be fastened to the base 23211 of an adjacent contact unit 230. The coupling structure 23212 may be provided with a fastening hole 23213.

Figure 9:
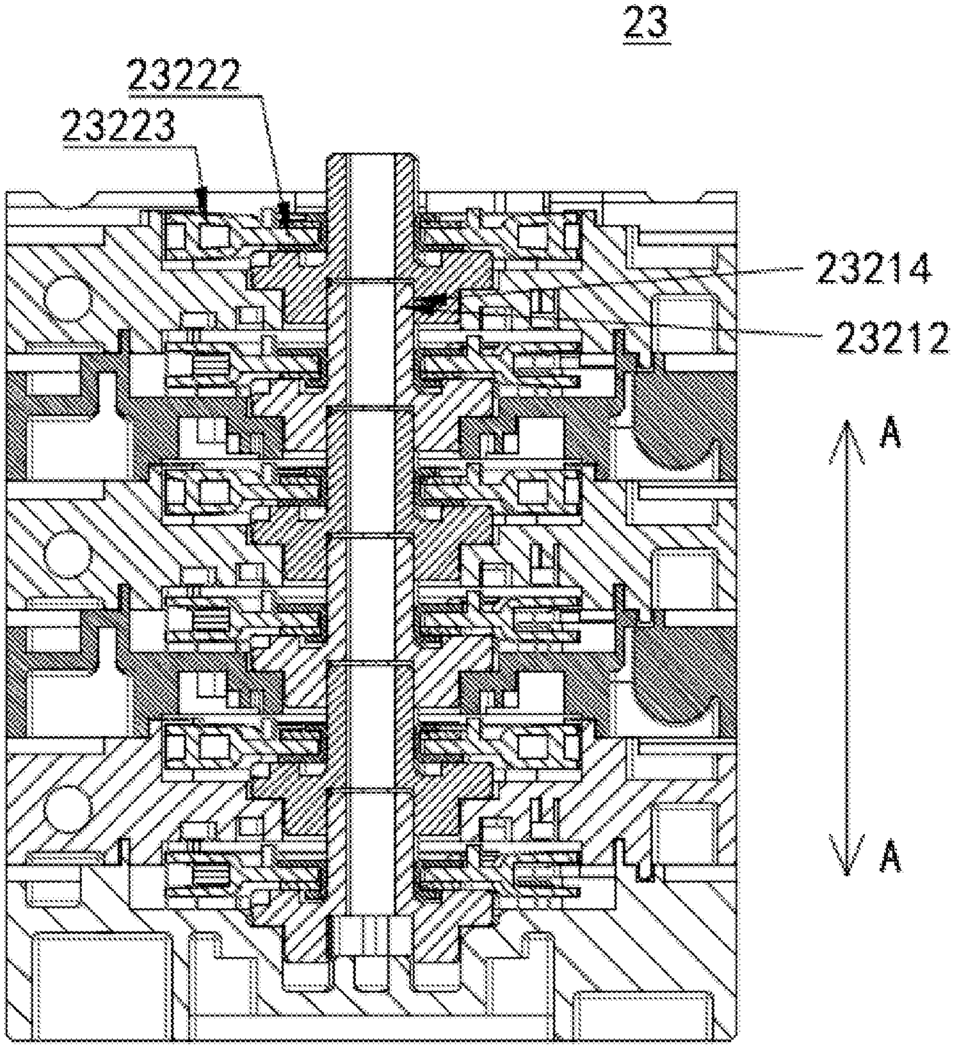
FIG. 9 is a schematic sectional diagram of a contact component of a switch according to an implementation.

The fastening hole 23213 is concavely formed from an end surface that is of the coupling structure 23212 and that is away from the base 23211, and the fastening hole 23213 is configured to cooperate with the contact connector S2 of the power mechanism 22. As shown in FIG. 9, the base 23211 is provided with a fastening hole 23214, the fastening hole 23214 of the base 23211 is concavely formed from an end surface that is of the base 23211 and that is away from the coupling structure 23212, and the coupling structure 23212 is inserted into the fastening hole 23214 of the base 23211, so that a movable part 232 and two adjacent contact units 230 are fastened.

The second rotation element 2322 is fastened to the first rotation element 2321. In an implementation, a fastening through hole 23221 is disposed at a central position of the second rotation element 2322, the second rotation element 2322 is sleeved on the coupling structure 23212 of the first rotation element 2321, and the first rotation element 2321 and the second rotation element 2322 are fastened through cooperation between the fastening through hole 23221 and the coupling structure 23212. The fastening through hole 23221 may be square and the coupling structure 23212 may be square columnar. The second rotation element 2322 is of a disk-shaped structure, and the second rotation element 2322 includes an intermediate region 23222 and an edge region 23223. The edge region 23223 is disposed around a periphery of the intermediate region 23222, and the fastening through hole 23221 is located at a center of the intermediate region 23222. The intermediate region 23222 is of a plate structure, and the edge region 23223 includes a first plate 23224 and a second plate 23225 that are disposed at an interval. A gap is formed between the first plate 23224 and the second plate 23225, and in an axial direction (the first direction) of the second rotation element 2322, the first plate 23224 and the second plate 23225 are laminated and disposed at an interval. In a radial direction of the second rotation element 2322, the intermediate region 23222 is directly facing an intermediate position of the gap between the first plate 23224 and the second plate 23225. A first notch 23226 is disposed on the first plate 23224, a second notch 23227 is disposed on the second plate 23225, and in an axial direction of the second rotation element 2322, the first notch 23226 and the second notch 23227 face each other. The movable contact 234 is fastened to a surface of the intermediate region 23222, and a part of the movable contact 234 extends into the first notch 23226 and the second notch 23227. The movable contact 234 may include an assembly part 2341 and a matching part 2342. The assembly part 2341 is fastened to the intermediate region 23222 of the second rotation element 2322, and the matching part 2342 is configured to cooperate with or separate from the inner connecting part 2331 of the static contact 233 to implement switch-on or switch-off. In an implementation, the matching part 2342 is an architecture of a pair of clamping pieces, and is configured to clamp the inner connecting part 2331. The pair of clamping pieces respectively extend into a position between the first plate 23224 and the second plate 23225 from positions between the first notch 23226 and the second notch 23227. When the matching part 2342 clamps the inner connecting part 2331, the matching part 2342 is elastically deformed, and the inner connecting part 2331 of the static contact 233 is clamped by using elastic force.

Figure 10:
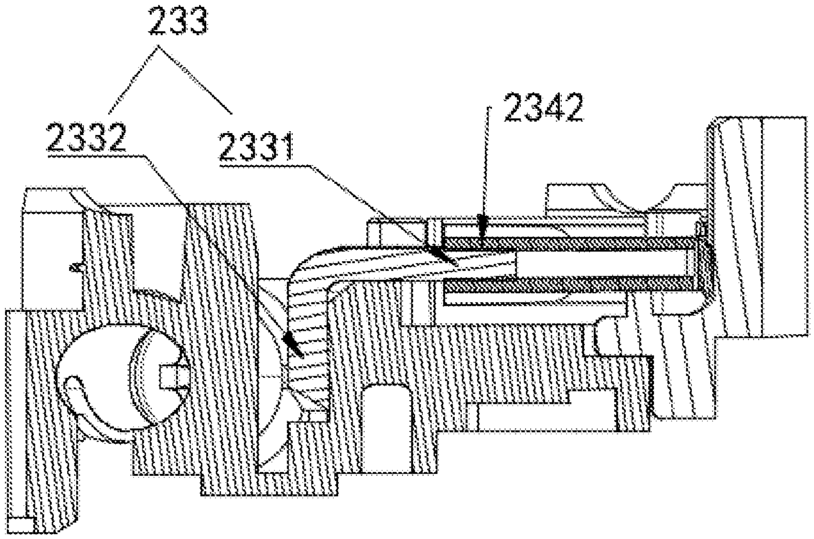
FIG. 10 is a schematic diagram of a local section of a movable contact and a static contact in a contact component of a switch in a switch-on state according to an implementation.
Figure 11:
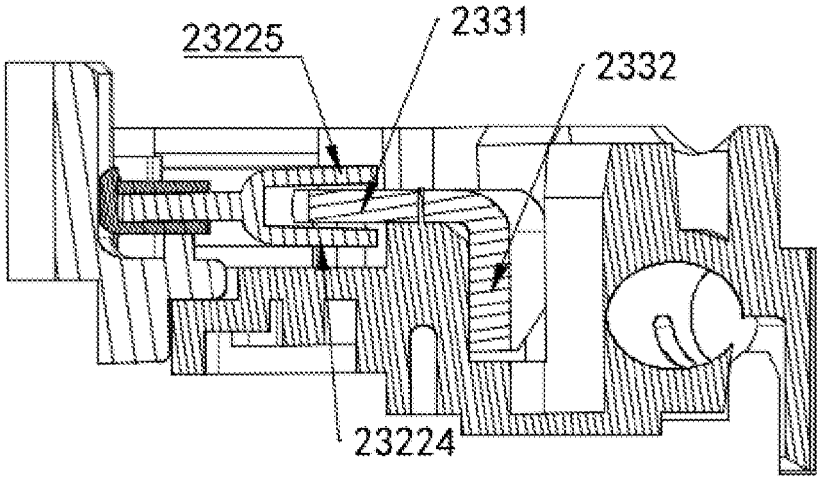
FIG. 11 is a schematic diagram of a local section of a movable contact and a static contact in a contact component of a switch in a switch-off state according to an implementation.

Referring to FIG. 10 to FIG. 11, the inner connecting part of the static contact 233 extends into the gap between the first plate 23224 and the second plate 23225. As shown in FIG. 10, when the movable part 232 rotates to the matching part 2342 of the movable contact 234 and faces the inner connecting part 2331, the matching part 2342 clamps the inner connecting part 2331 of the static contact 233, and the matching part 2342 and the inner connecting part 2331 are electrically connected. This state is the switch-on state of the switch. As shown in FIG. 11, when the movable part 232 rotates to the matching part 2342 of the movable contact 234 and separates from the inner connecting part 2331 of the static contact 233, the inner connecting part 2331 is between the first plate 23224 and the second plate 23225, and a gap is formed between two surfaces of the inner connecting part 2331 and both the first plate 23224 and the second plate 23225. This state may be the switch-off state of the switch.

Figure 12:
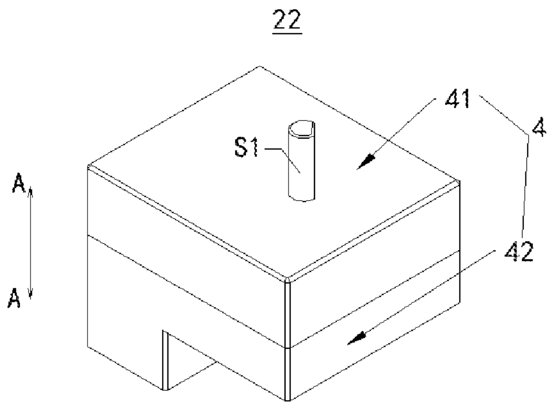
FIG. 12 is a schematic diagram of a power mechanism of a switch according to an implementation.
Figure 13:
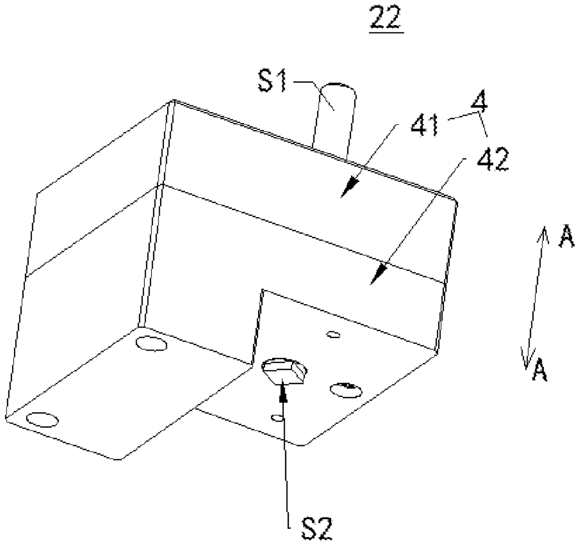
FIG. 13 is a schematic diagram of a power mechanism of a switch in another direction according to an implementation.

With reference to FIG. 12 and FIG. 13, the cover body 4 of the power mechanism 22 covers a linkage apparatus inside. An upper cover 41 and a lower cover 42 of the cover body 4 are fastened to each other. The upper cover 41 and the lower cover 42 may be fastened by using a fastener or the upper cover 41 and the lower cover 42 may be fastened by using an adhesive. In this implementation, the knob connector S1 of the linkage apparatus 5 extends out of the cover body 4 from the upper cover 41, the contact connector S2 of the linkage apparatus 5 extends out of the cover body 4 from the lower cover 42, and the contact connector S2 is configured to be fastened to the movable part 232 of the contact component 23, which may alternatively be understood as that the contact connector S2 is fastened to the movable contact 234. In this way, a rotation process of the contact connector S2 may drive the movable contact 234 to rotate around a central axis X of the contact component 23 (referring to FIG. 7).

Figure 14:
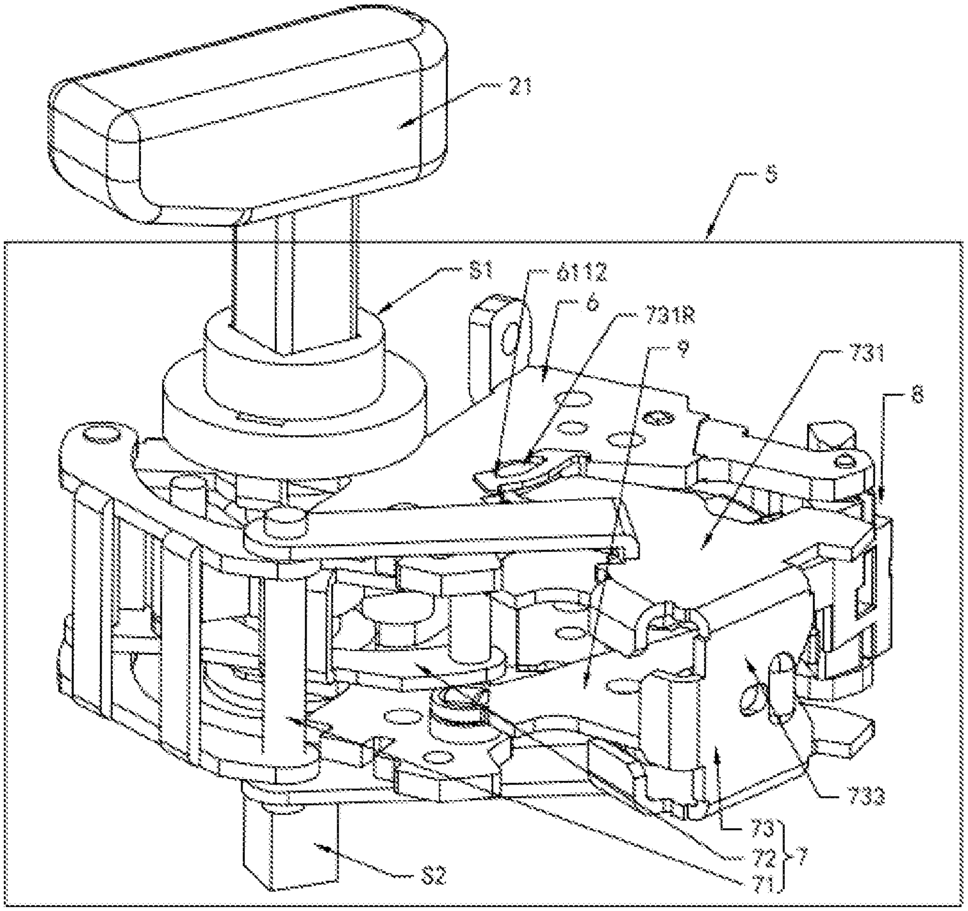
FIG. 14 is a three-dimensional schematic diagram of a linkage apparatus of a power mechanism in two directions according to a first implementation.
Figure 15:
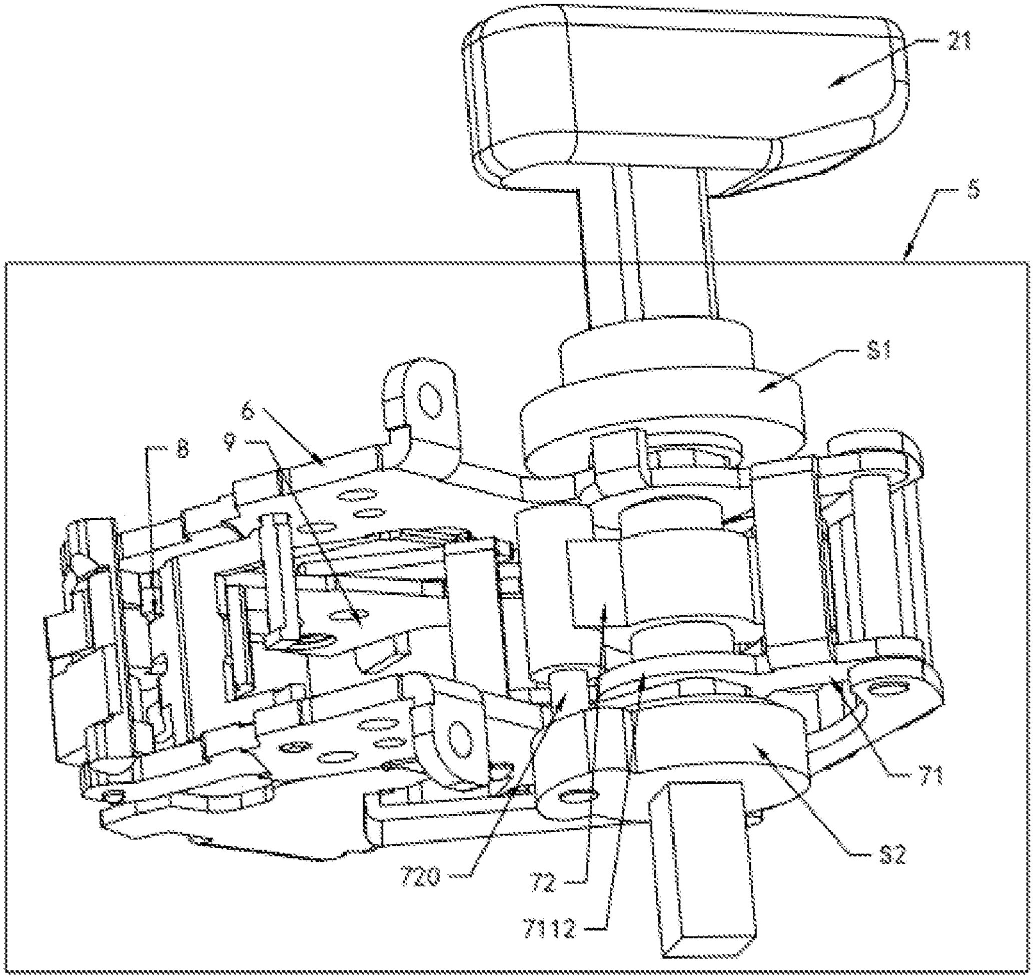
FIG. 15 is a three-dimensional schematic diagram of a linkage apparatus of a power mechanism in two directions according to a first implementation.
Figure 16:
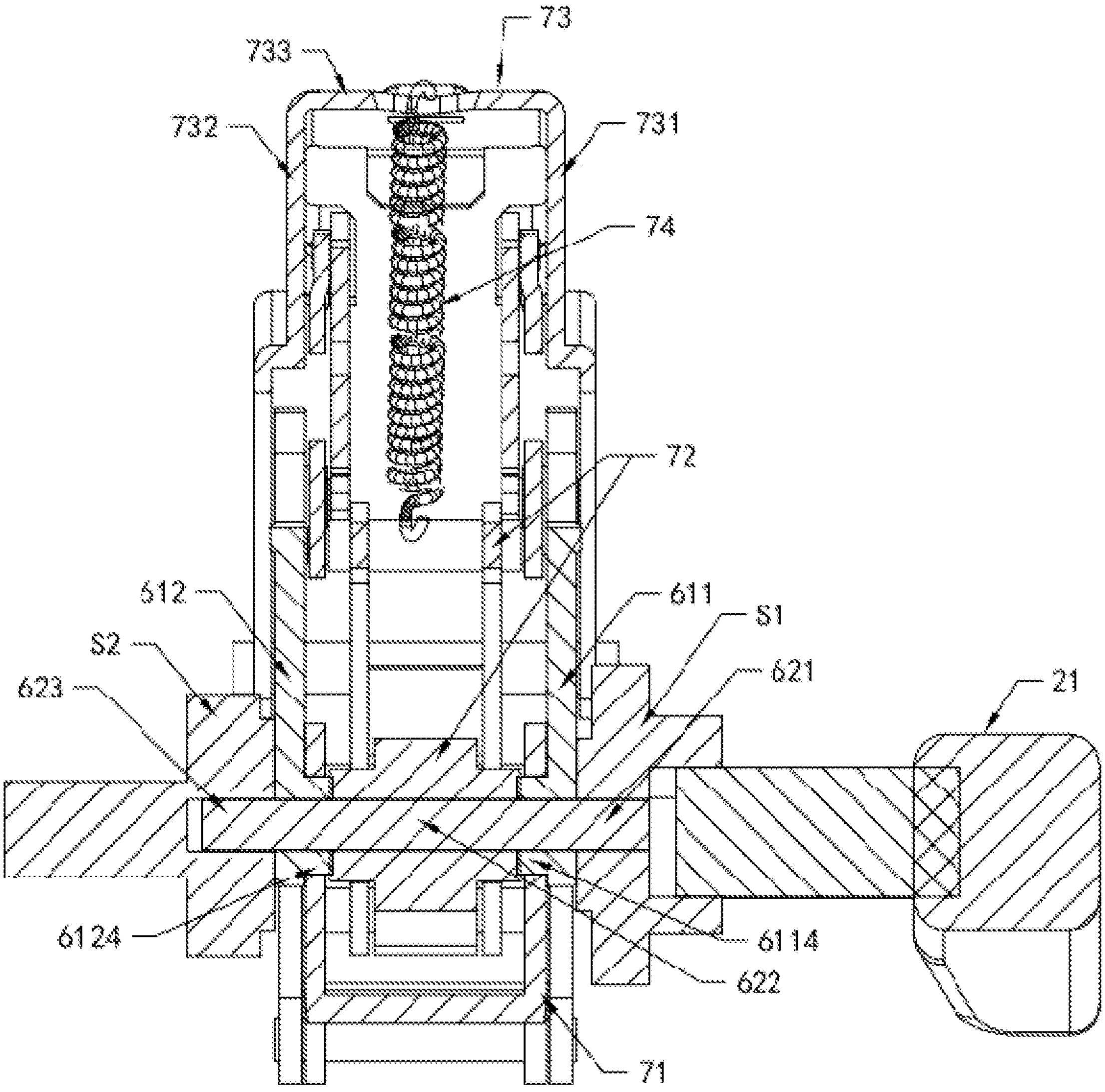
FIG. 16 is a sectional view of a linkage apparatus of a power mechanism according to a first implementation.
Figure 17:
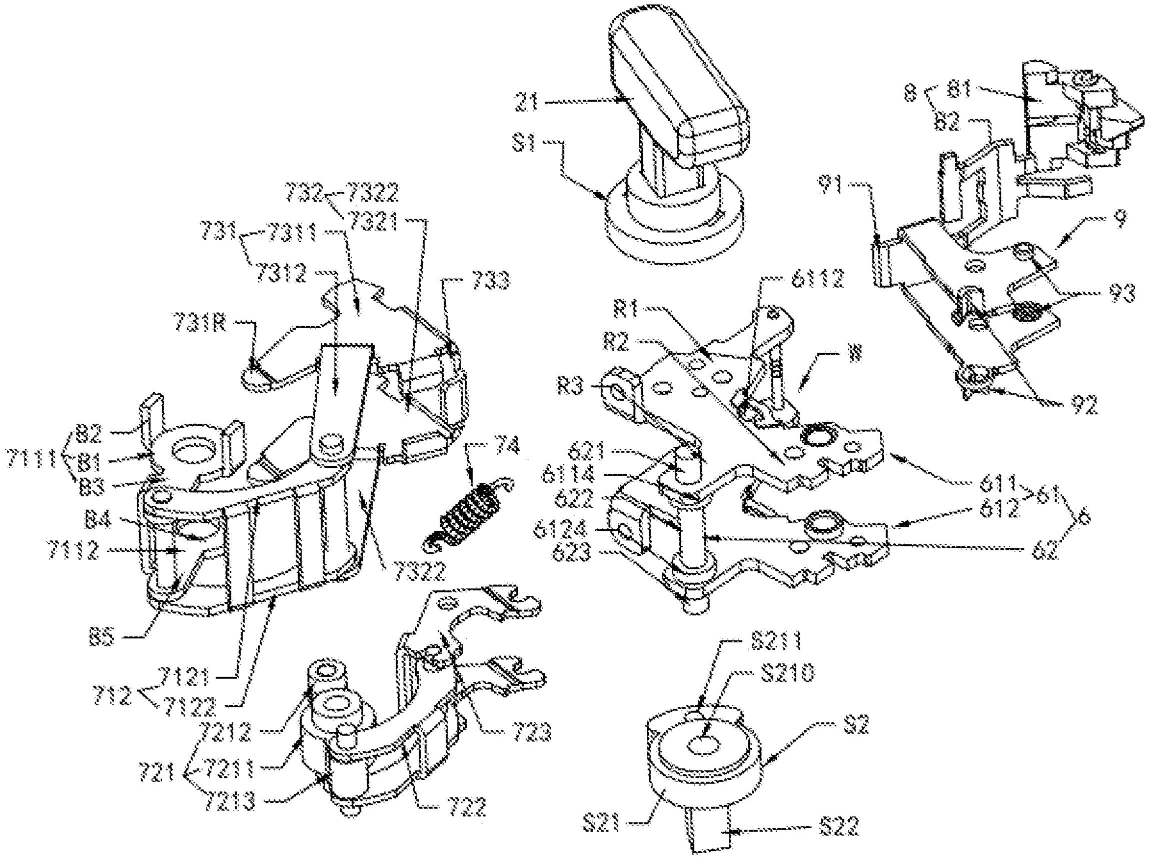
FIG. 17 is an exploded view of a linkage apparatus of a power mechanism in two directions according to a first implementation.
Figure 18:
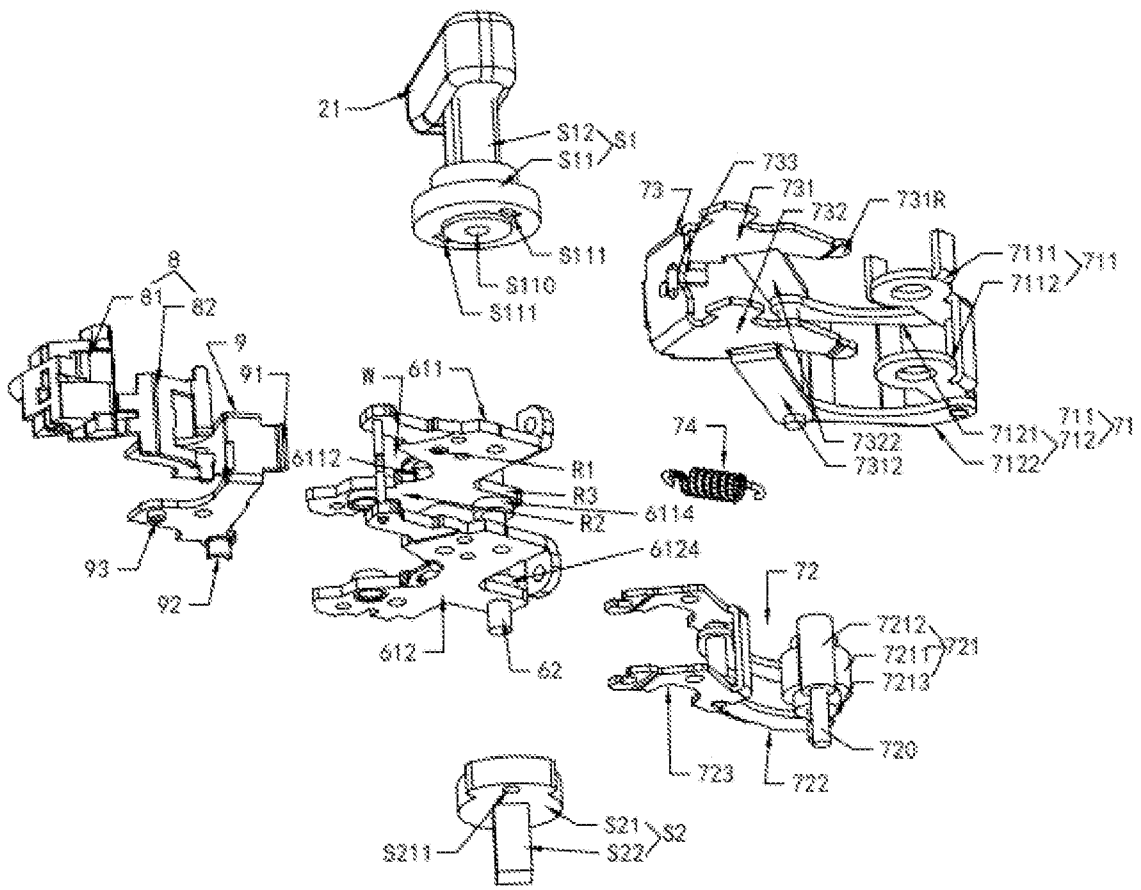
FIG. 18 is an exploded view of a linkage apparatus of a power mechanism in two directions according to a first implementation.

The embodiments may provide a plurality of different structural forms of the power mechanism. The following describes in detail a main solution in the first implementation. FIG. 14 to FIG. 18 are schematic diagrams of a power mechanism according to a first implementation. FIG. 14 and FIG. 15 are schematic three-dimensional diagrams of a linkage apparatus 5 of the power mechanism in two directions according to the first implementation. FIG. 16 is a sectional view of the linkage apparatus 5 of the power mechanism according to the first implementation. FIG. 17 and FIG. 18 are exploded views of the linkage apparatus 5 of the power mechanism in two directions according to the first implementation.

Referring to FIG. 14, FIG. 15, FIG. 16, FIG. 17, and FIG. 18, in the first implementation, the linkage apparatus 5 of the power mechanism 22 includes a fastening bracket 6, a knob connector S1, a contact connector S2, a transmission component 7, a trip unit 8, and a cradle 9. The knob connector S1 is fastened to the knob 21, the contact connector S2 is configured to be fastened to a movable contact in a contact component, the knob connector S1 and the contact connector S2 are both rotatively connected to the fastening bracket 6, and rotation centers of the knob connector S1 and the contact connector S2 are collinear. The transmission component 7 is used to implement power transmission between the knob connector S1 and the contact connector S2. The cradle 9 is rotatively connected to the fastening bracket 6, the cradle 9 is connected to the transmission component 7, the cradle 9 cooperates with the trip unit 8, and a cooperation relationship between the cradle 9 and the trip unit 8 includes a fastening state and a tripping state. When a direct current source or a power conversion unit in a power supply system operates normally, the cradle 9 and the trip unit 8 are in the fastening state. When the direct current source or the power conversion unit in the power supply system is faulty, the control unit of the power supply system sends a switch-off signal to the trip unit 8 of a switch. The trip unit 8 is configured to receive the switch-off signal, to implement tripping between the trip unit 8 and the trip fastener 9. In the tripping state, the transmission component 7 moves by using a connection relationship between the cradle 9 and the transmission component, so that the movable contact is separated from the static contact, and the switch is switched off.

Referring to FIG. 17 and FIG. 18, in the first implementation, the fastening bracket 6 includes a bracket body 61 and a main shaft 62 fastened to the bracket body 61. The bracket body 61 includes a first plate 611 and a second plate 612 that are disposed opposite to each other. The first plate 611 and the second plate 612 are arranged at an interval along a first direction, the first plate 611 is located on an inner side of the upper cover 41 (referring to FIG. 12 and FIG. 13), and the second plate 612 is located on an inner side of the lower cover 42 (referring to FIG. 12 and FIG. 13). The first plate 611 and the second plate 612 are fastened inside the cover body 4 (referring to FIG. 12 and FIG. 13). In an implementation, the first plate 611 includes a first region R1, a second region R2, and a third region R3 that are connected together. The first region R1 and the second region R2 are jointly enclosed to form a notch W. The first region R1 is configured to connect to the trip unit 8, and the second region R2 is configured to connect to the cradle 9. The third region R3 is located on a side that is of a junction between the first region R1 and the second region R2 and that is away from the notch W, and the third region R3 is configured to connect to the main shaft 62. A connection position between the first region R1 and the trip unit 8 and a connection position between the second region R2 and the cradle 9 are distributed on two sides of the notch W. The notch W includes an open end and a bottom end, and the bottom end is located at an edge position of the junction between the first region R1 and the second region R2. The notch W may be a triangle, and a bottom end of the notch W may be located at a corner position of the triangle. A rotation matching structure 6112 is disposed at the bottom end of the notch W. The rotation matching structure 6112 is configured to be rotatively connected to the transmission element in the transmission component 7, and the notch W is configured to accommodate some transmission elements. The rotation matching structure 6112 may be a hole structure or a slot structure. In a first implementation, the rotation matching structure 6112 is an arc-shaped hole structure and cooperates with the transmission element by using an arc-shaped surface, so that a connection between the rotation matching structure 6112 and the transmission element is stable and reliable. In another implementation, the rotation matching structure 6112 may alternatively be a circular hole structure, and a rotation connection between the first plate 611 and a transmission element 73 is implemented through cooperation between a cylindrical rotation shaft and the circular hole structure. A structure of the first plate 611 is the same as that of the second plate 612, and the structure of the second plate 612 is not described herein again.

Referring to FIG. 16, FIG. 17, and FIG. 18, the knob connector S1 is rotatively connected to one end of the main shaft 62, and the contact connector S2 is rotatively connected to the other end of the main shaft 62. In an axial direction of the main shaft 62, the contact connector S2, the bracket body 61, and the knob connector S1 are sequentially arranged, and a rotation center of the knob connector S1 and a rotation center of the contact connector S2 are both located on a central axis of the main shaft 62. Specially, the main shaft 62 passes through the first plate 611 and the second plate 612. A fastened connection between the main shaft 62 and the bracket body 61 may be implemented by using interference fit between the main shaft 62 and the first plate 611 and between the main shaft 62 and the second plate 612. The main shaft 62 includes a first segment 621, an intermediate segment 622, and a second segment 623 that are sequentially arranged. The first segment 621 is located on a side that is of the first plate 611 and that is away from the second plate 612, the second segment 623 is located on a side that is of the second plate 612 and that is away from the first plate 611, the knob connector S1 is rotatively connected to the first segment 621, the contact connector S2 is rotatively connected to the second segment 623, and the intermediate segment 622 is located between the first plate 611 and the second plate 612.

The first plate 611 further includes a first mounting sleeve 6114 protruding in a direction toward the second plate 612. A central through hole of the first mounting sleeve 6114 is configured to accommodate the main shaft 62. The first mounting sleeve 6114 is located at a periphery of the main shaft 62, and is relatively fastened to the main shaft 62. Similarly, the second plate 612 includes a second mounting sleeve 6124 protruding in a direction toward the first plate 611. A central through hole of the second mounting sleeve 6124 is configured to accommodate the main shaft 62. The second mounting sleeve 6124 is located at the periphery of the main shaft 62 and is relatively fastened to the main shaft 62. Outer side surfaces of the first mounting sleeve 6114 and the second mounting sleeve 6124 are both cylindrical surfaces.

Referring to FIG. 16 and FIG. 18, in the first implementation, the knob connector S1 includes a first base S11 and a first rod element S12, the first rod element S12 is fastened to one side of the first base S11, the first rod element S12 is configured to connect to the knob 21, and the first rod element S12 cooperates with the mounting hole 213 of the base body 212 of the knob 21 (referring to FIG. 5). A first intermediate hole S110 and a first fastening hole S111 are disposed on a surface that is of the first base S11 and that is away from the first rod element S12. The first intermediate hole S110 is configured to cooperate with the main shaft 62, that is, one end of the main shaft 62 is inserted into the first intermediate hole S110 and is fastened to the first base S11. There are two first fastening holes S111, which are distributed on two sides of the first intermediate hole S110. The first fastening holes S111 are configured to connect to a first linkage structure of the transmission component 7. There may alternatively be one, three, or more first fastening holes S111. A central axis of the first rod element S12 and a central axis of the first intermediate hole S110 are collinear, and the two central axes and the central axis of the main shaft 62 are collinear.

Referring to FIG. 16 and FIG. 17, in a first implementation, the contact connector S2 includes a second base S21 and a second rod element S22, the second rod element S22 is fastened to one side of the second base S21, a second intermediate hole S210 and a second fastening hole S211 are disposed on a surface that is of the second base S21 and that is away from the second rod element S22, the second intermediate hole S210 is configured to be fastened to one end of the main shaft 62, and the second fastening hole S211 is configured to fasten and connect to a second linkage structure of the transmission component. There is one second fastening hole S211. A central axis of the second rod element S22 and a central axis of the second intermediate hole S210 are collinear, and the two central axes and a central axis of the main shaft 62 are collinear.

Referring to FIG. 14, FIG. 15, FIG. 16, FIG. 17, and FIG. 18, the transmission component 7 includes a first linkage structure 71, a second linkage structure 72, a transmission element 73, and an elastic element 74. The transmission element 73 is rotatively connected to the fastening bracket 6, and the first linkage structure 71 is connected between the transmission element 73 and the knob connector S1, to drive, by rotating the knob 21, the transmission element 73 to rotate relative to the fastening bracket 6. The second linkage structure 72 is connected between the transmission element 73 and the contact connector S2, to drive, by rotating the transmission element 73 relative to the fastening bracket 6, the contact connector S2 to move, so that the movable contact moves.

In a first implementation, a structure of the transmission element 73 may be described as follows.

The transmission element 73 includes a first arm 731, a second arm 732, and an intermediate arm 733. The first arm 731 and the second arm 732 are oppositely spaced, and the intermediate arm 733 is fastened between the first arm 731 and the second arm 732. The first arm 731 is rotatively connected to the first plate 611, and the second arm 732 is rotatively connected to the second plate 612. In an implementation, a structure of the first arm 731 is the same as that of the second arm 732. The first arm 731 includes a first main arm 7311 and a first branch arm 7312. The first main arm 7311 is configured to be rotatively connected to the first plate 611, one end of the first branch arm 7312 is fastened to the first main arm 7311, and the other end of the first branch arm 7312 is configured to be rotatively connected to the first linkage structure 71. The second arm 732 includes a second main arm 7321 and a second branch arm 7322. The second main arm 7321 is configured to be rotatively connected to the second plate 612, one end of the second branch arm 7322 is fastened to the second main arm 7321, and the other end of the second branch arm 7322 is configured to be rotatively connected to the first linkage structure 71. The intermediate arm 733 is connected between the first main arm 7311 and the second main arm 7321. One end that is of the first main arm 7311 and that is away from the intermediate arm 733 includes a connection structure 731R, where the connection structure 731R is configured to cooperate with the rotation matching structure 6112 of the first plate 611 (as shown in FIG. 14), to implement a rotation connection between the first main arm 7311 and the first plate 611. A structure of the second main arm 7321 may be the same as that of the first main arm 7311, and an architecture of a rotation connection relationship between the second main arm 7321 and the second plate 612 may be the same as an architecture of the rotation connection relationship between the first main arm 7311 and the first plate 611.

An outer side of the first plate 611 refers to a side that is of the first plate 611 and that is away from the second plate 612 (a side of an outer surface of the first plate 611), and an inner side of the first plate 611 refers to a side that is of the first plate 611 and that faces the second plate 612 (a side of an inner surface of the first plate 611). An outer side of the second plate 612 refers to a side that is of the second plate 612 and that is away from the first plate 611 (a side of an outer surface of the second plate 612), and an inner side of the second plate 612 refers to a side that is of the second plate 612 and that faces the first plate 611 (a side of an inner surface of the second plate 612). In an implementation, the first branch arm 7312 is located on the outer side of the first plate 611, the second branch arm 7322 is located on the outer side of the second plate 612, a part (a connection structure of the first main arm 7311) that is on the first main arm 7311 and that is rotatively connected to the first plate 611 is located on the inner side of the first plate 611, and a part (a connection structure of the second main arm 7321) that is on the second main arm 7321 and that is rotatively connected to the second plate 612 is located on the inner side of the second plate 612. In this solution, the first branch arm 7312 and a part of the first main arm 7311 are respectively disposed on two sides of the first plate 611, and the second branch arm 7322 and a part of the second main arm 7321 are respectively disposed on two sides of the second plate 612. Reliable assembly positioning can be implemented by clamping the first plate 611 and the second plate 612 by using a structure of the transmission element, so that an assembly structure between the transmission element 73 and the fastening bracket 6 can be simplified. This helps miniaturization of a whole size of a force transfer mechanism.

The intermediate arm 733 of the transmission element is configured to connect to the second linkage structure 72. The intermediate arm 733 may be elastically connected to the second linkage structure 72 by using the elastic element 74. The elastic element 74 may be a spring. The elastic element 74 is configured to store elastic potential energy in a movement process of the transmission element 73. The elastic potential energy of the elastic element 74 is used to drive an action of the force transfer mechanism.

In the first implementation, a structure of the first linkage structure 71 may be described as follows.

The first linkage structure 71 includes a first rotation structure 711 and a first connecting rod structure 712. The first rotation structure 711 includes a first part 7111 and a second part 7112 that are oppositely spaced and fastened to each other. The first part 7111 is sleeved on the periphery of the main shaft 62 and adjacent to the first plate 611. The first part 7111 may be sleeved on the first mounting sleeve 6114 of the first plate 611. The first part 7111 is fastened to the first base S11 of the knob connector S1. The first part 7111 includes an annular main body B1, a fastened foot B2, and an extension part B3. The annular main body B1 is sleeved on the first mounting sleeve 6114, and the fastened foot B2 extends toward the knob connector S1 from an outer edge position of the annular main body B1 and is fastened to the first base S11 of the knob connector S1. The fastened foot B2 may be inserted into the fastening hole S111 of the first base S11. The extension part B3 extends outwards from an outer edge of the annular main body B1 along a radial direction of the annular main body B1, and the extension part B3 is configured to connect to the first connecting rod structure 712. The second part 7112 is sleeved on the periphery of the main shaft 62 and adjacent to the second plate 612. Specially, the second part 7112 is sleeved on the second mounting sleeve 6124 of the second plate 612. The second part 7112 includes an annular main body B4 and an extension part B5. The annular main body B4 of the second part 7112 is sleeved on the second mounting sleeve 6124. The extension part B5 of the second part 7112 extends outwards from an outer edge of the annular main body B4 along a radial direction of the annular main body B4. The extension part B5 of the second part 7112 is fastened to the extension part B3 of the first part 7111.

The first rotation structure 711 is movably connected to the transmission element 73 by using the first connecting rod structure 712, one end of the first connecting rod structure 712 is rotatively connected to the first rotation structure 711, and the other end of the first connecting rod structure 712 is rotatively connected to the transmission element 73.

The first connecting rod structure 712 includes a first rod 7121 and a second rod 7122. The first rod 7121 and the second rod 7122 are oppositely spaced and fastened. One end of the first rod 7121 is rotatively connected to the extension part B3 of the first part 7111, and the other end of the first rod 7121 is rotatively connected to the first branch arm 7312 of the first arm 731. One end of the second rod 7122 is rotatively connected to the extension part B5 of the second part 7112, and the other end of the second rod 7122 is rotatively connected to the second branch arm 7322 of the second arm 732. In this implementation, the first linkage structure is formed between the first arm 731 of the transmission element 73 and the first part 7111 of the first rotation structure 711 by using the first rod 7121 and the first branch arm 7312, and the second linkage structure is formed between the second arm 732 of the transmission element 73 and the second part 7112 of the first rotation structure 711 by using the second rod 7122 and the second branch arm 7322. In a process of rotating the knob, the first rotation structure 711 rotates by using the main shaft 62 as a center, and drives the first linkage structure and the second linkage structure to move at the same time. When the first linkage structure and the second linkage structure move synchronously, the transmission element 73 is driven to rotate relative to the fastening bracket 6. Because force exerted by the first linkage structure and the second linkage structure on the transmission element 73 are located on two sides of the transmission element 73, that is, a balanced force application effect, so that movement of the transmission element 73 is balanced, and the transmission element 73 does not shake, efficiency and smoothness of switching on and off can be improved, and a problem of being stuck in a movement process of the transmission element 73 is resolved.

In the first implementation, a structure of the second linkage structure 72 may be described as follows.

The second linkage structure 72 includes a second rotation structure 721 and a second connecting rod structure 722. The second rotation structure 721 includes an intermediate sleeve 7211 and a first bump 7212 and a second bump 7213 that are protrudingly disposed on an outer surface of the intermediate sleeve 7211. The intermediate sleeve 7211 is sleeved on the main shaft 62, and the intermediate sleeve 7211 is located between the first part 7111 and the second part 7112 of the first rotation structure 711. The first bump 7212 is fastened to the contact connector S2 by using a fastened pin 720. The fastened pin 720 and an outer side surface of the second part 7112 of the first rotation structure 711 are disposed at an interval (as shown in FIG. 15), and the outer side surface of the second part 7112 is a surface that is of the second part 7112 and that is away from the main shaft 62 in a radial direction of the main shaft 62. The second bump 7213 is rotatively connected to one end of the second connecting rod structure 722. The second connecting rod structure 722 is located between the first plate 611 and the second plate 612 and is configured to connect to the transmission element 73. One end of the second connecting rod structure 722 that is far away from the second bump 7213 may be elastically connected to the intermediate arm 733 of the transmission element 73 by using the elastic element 74. In a process in which the transmission element 73 rotates relative to the fastening bracket 6, the elastic element 74 drives the second connecting rod structure 722 to move, the second connecting rod structure 722 drives the second rotation structure 721 to rotate by using the main shaft 62 as a center, and the movable contact rotates synchronously with the second rotation structure 721.

In this implementation, the second linkage structure 72 further includes a third connecting rod structure 723, one end of the third connecting rod structure 723 is rotated to one end that is of the second connecting rod structure 722 and that is away from the second bump 7213, the other end of the third connecting rod structure 723 is rotated to the cradle 9, and the third connecting rod structure 723 is connected between the cradle 9 and the first connecting rod structure 712. When the cradle 9 and the trip unit 8 are unlocked, elastic force of the elastic element 74 is transferred to the cradle 9 by using the second linkage structure 72, so that the cradle 9 can rotate relative to the fastening bracket 6, the third connecting rod structure 723 moves synchronously, and the third connecting rod structure 723 drives the second connecting rod structure 722 to move, and drives the second rotation structure 721 and the movable contact to rotate, to implement free tripping (automatic tripping) of the switch.

In the first implementation, detailed structures of the cradle 9 and the trip unit 8 are as follows.

The trip unit 8 includes a first trip element 81 and a second trip element 82. Both the first trip element 81 and the second trip element 82 are rotatively connected to the bracket body 61. The first trip element 81 may be located between the first plate 611 and the second plate 612 and may be rotatively connected to the first plate 611 and the second plate 612, and the second trip element 82 is also located between the first plate 611 and the second plate 612 and rotatively connected to the first plate 611 and the second plate 612. The first trip element 81 and the second trip element 82 cooperate (or are coupled) to implement the free tripping (or automatic tripping). The first trip element 81 is configured to receive a switch-off signal sent by a control unit of a power supply system, and when receiving the switch-off signal, the first trip element 81 automatically cancels a cooperation relationship (or decouples) with the second trip element 82.

The cradle 9 includes a jump clamping part 91, a first transferring part 92, and a second transferring part 93. The jump clamping part 91 is configured to cooperate with the second trip element 82 in a locked state. When the first trip element 81 receives a switch-off signal, the first trip element 81 and the second trip element 82 cancel a cooperation relationship, so that the second trip element 82 moves. In this case, the jump clamping part 91 and the second trip element 82 are unlocked. The first transferring part 92 is configured to be rotatively connected to the bracket body 61 of the fastening bracket 6. The cradle 9 may be located between the first plate 611 and the second plate 612 and may be rotatively connected to the first plate 611 and the second plate 612 by using the first transferring part 92. The second transferring part 93 is rotatively connected to the third connecting rod structure 723 of the second linkage structure 72 of the transmission component 7. In this way, when the jump clamping part 91 and the second trip element 82 are unlocked, elastic potential energy of the elastic element 74 connected between the transmission element 73 and the second linkage structure 72 drives the cradle 9 to rotate relative to the fastening bracket 6, and the third connecting rod structure 723 drives the second connecting rod structure 722 and the second rotation structure 721 to move, so that the movable contact moves, and free tripping is implemented. On the cradle 9, the jump clamping part 91, the first transferring part 92, and the second transferring part 93 are distributed into a triangular structure. This position arrangement enables an overall structure of the cradle 9 to have an advantage of a small size, and a connection relationship between the cradle 9 and the fastening bracket 6 and the second linkage structure 72 is also compact.

Because of the coaxial and collinear structure of the knob connector and the contact connector of the power mechanism, an overall structure of the power mechanism is more compact, so that the power mechanism can be arranged in small space, which helps implement miniaturization of the switch. In addition, the switch may be more secure. When fusion welding occurs between the movable contact and the static contact, in a normal manual switch-off process, the knob may not drive the movable contact to move by rotating to a preset position. In this case, the knob may continue to be rotated, so that the first rotation structure of the first linkage structure comes in contact with and pushes the second rotation structure of the second linkage structure. The movable contact may be forced to leave the static contact, to implement switch-off by using abutting force between the first rotation structure and the second rotation structure (the abutting force is greater than connection force generated by fusion welding between the movable contact and the static contact).

In the power mechanism of the switch, the four-connecting rod structure formed by using the second linkage structure may drive the movable contact to rotate at a relatively large angle when the transmission element rotates at a relatively small angle. For example, the transmission element rotates by 36 degrees, and the movable contact rotates by 90 degrees. When the transmission element is in a free tripping state (trip position), a small rotation angle of the transmission element can implement a large rotation angle of the movable contact, and provide a clear indication of the tripping state (trip position) for maintenance personnel.

For an operating principle of the first implementation, refer to FIG. 19 to FIG. 24. With reference to FIG. 14 to FIG. 18, OA represents the contact connector, OE represents the knob connector, GFK represents the transmission element, and OEK represents the first linkage structure (OE represents the first rotation structure 711, and EK represents the first connecting rod structure 712), OABC represents the second linkage structure (OA represents the second rotation structure 721, AB represents the second connecting rod structure 722, and BC represents the third connecting rod structure 723), a dashed line between GB represents the elastic element 74, DCH represents the cradle 9, and MY and XT represent the trip unit 8 (XT represents the first trip element 81, and MY represents the second trip element 82). The static contact is horizontally arranged. The movable contact rotates, in a clockwise manner, around an O point to close and rotates, in a counterclockwise manner, around the O point to open. The OA is rigidly coupled with the movable contact and rotates synchronously.

Figure 19:
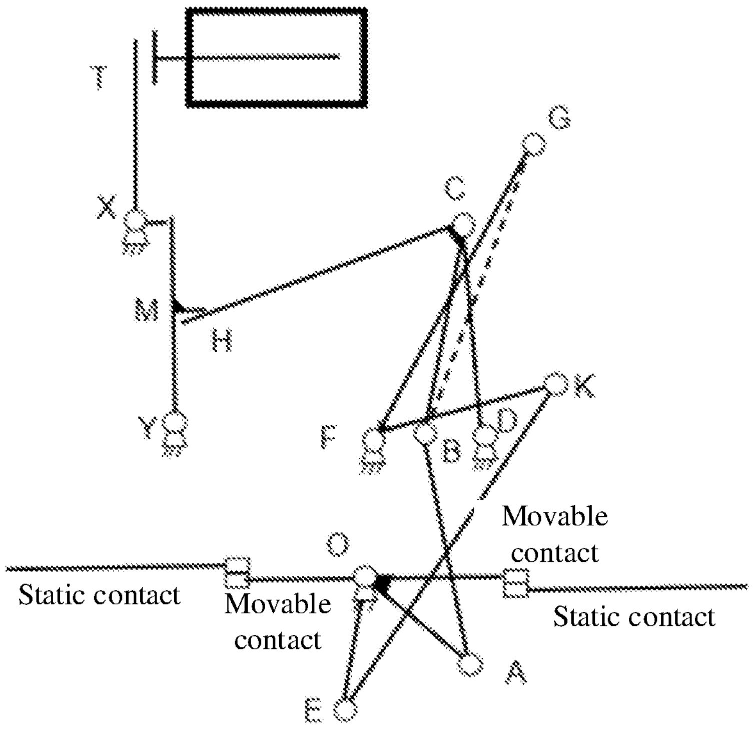
FIG. 19 is a schematic diagram of a switch in a switch-on state (a movable contact and a static contact are in a closed state) according to an implementation.
Figure 20:
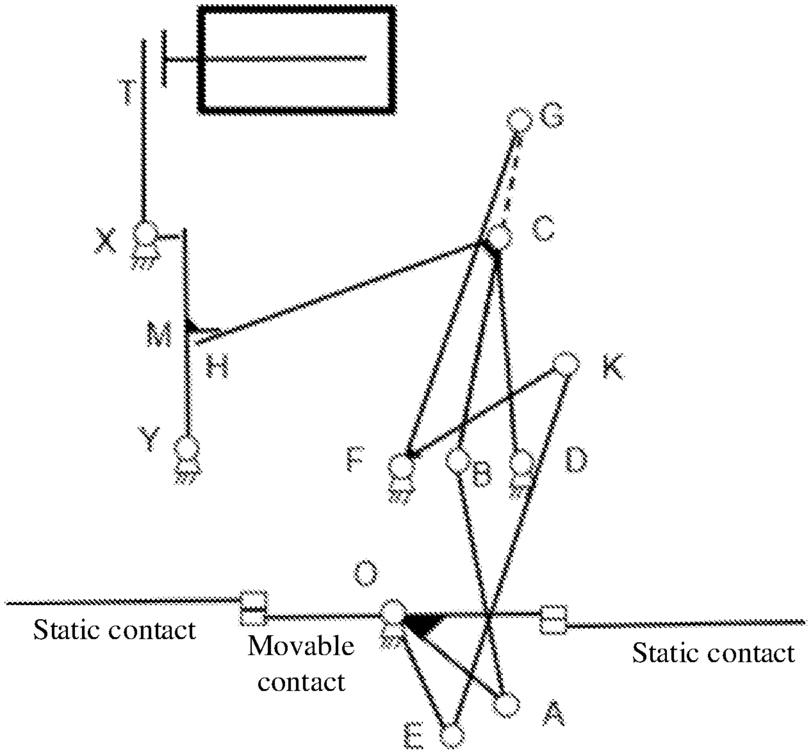
FIG. 20 is a schematic diagram of a switch-off dead point position when a switch is in a switch-off process according to an implementation.
Figure 21:
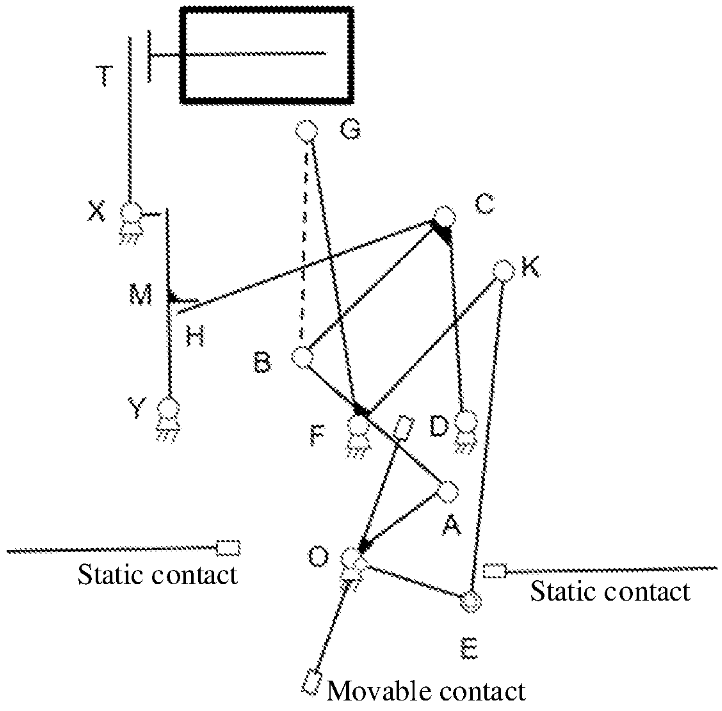
FIG. 21 is a schematic diagram of a switch in a switch-off state according to an implementation.

For a manual switch-off process, refer to FIG. 19, FIG. 20, and FIG. 21. FIG. 19 is a schematic diagram of a switch in a switch-on state (the movable contact and the static contact are in a closed state), FIG. 20 is a schematic diagram of a switch-off dead point position in the switch-off process, and FIG. 21 is a schematic diagram of a switch in a switch-off state (the movable contact and the static contact are separated). The manual switch-off process is as follows: The knob is rotated. OE rod rotates around the O point. The four-connecting rod mechanism formed by OE-EK-FK moves. Because KF rod and GK rod are in a rigid coupling relationship, KF rod and GK rod synchronously rotate around an F point. After OE rod rotates, in a counterclockwise manner, by 90 degrees at a switch-on position shown in FIG. 19, GF rod synchronously rotates by 36 degrees. An elastic element is mounted between a G point on GK rod and a point B on CB rod. When OE rod drives FK rod to rotate, GK rod rotates synchronously. When OE rod rotates counterclockwise to a dead point shown in FIG. 20 (an elastic element GB and CB are collinear), OA rod that is fastened to the movable contact does not rotate. When OE rod rotates at the dead point shown in FIG. 20 again at a small angle, in this case, pulling force of GB generates a clockwise torque for CB rod, and CB rod drives BA rod and AO rod, so that AO rod quickly opens the movable contact in a counterclockwise manner. In this case, the switch is located in a switch-off position shown in FIG. 21. In this way, a manual switch-off action is completed.

Figure 22:
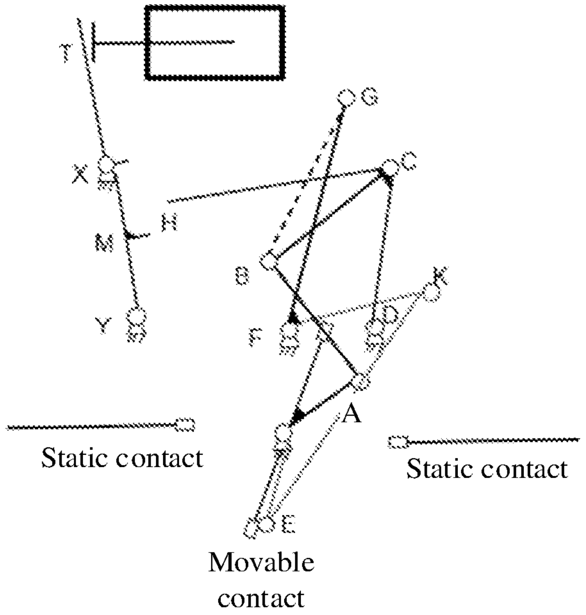
FIG. 22 is a schematic diagram of a position when a switch is in a manual switch-on process according to an implementation.

FIG. 22 is a schematic diagram of a position in a manual switch-on process. For a manual switch-on process of the switch, refer to FIG. 21 and FIG. 22. Based on the switch-off position shown in FIG. 21, when four-connecting rod OE-EK-KF drives OE to rotate under external force in a clockwise manner, the spring GB rotates around the point B in a clockwise manner. At a certain angle, that is, at a position shown in FIG. 22, GB and CB coincide in a collinear manner. Before this, the movable contact does not rotate. When OE rotates by a small angle again in a clockwise manner, the spring GB generates a counterclockwise torque around C for CB, and quickly drives a movable contact system to close to the position shown in FIG. 19 under the action of four-connecting rod CB-BA-AO.

Figure 23:
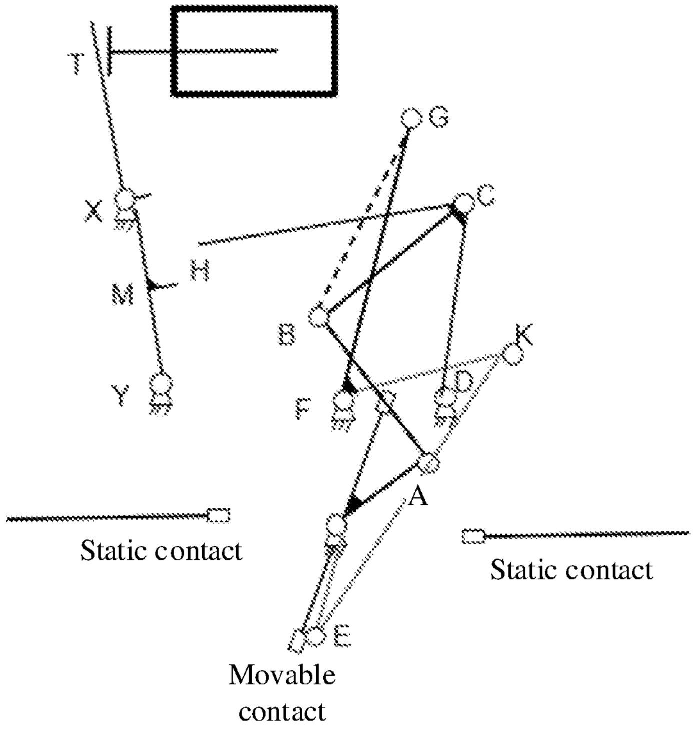
FIG. 23 is a schematic diagram of a switch in a free tripping state according to an implementation.
Figure 24:
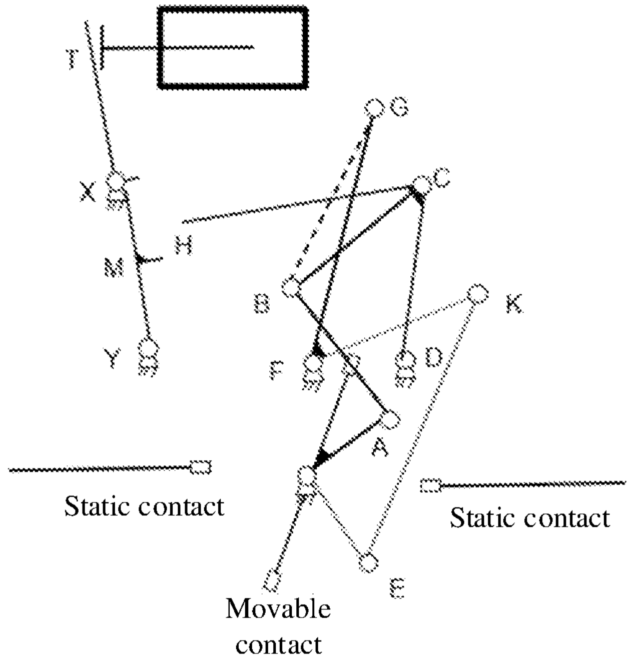
FIG. 24 is a schematic diagram of a switch in a free tripping state according to an implementation.

FIG. 23 and FIG. 24 are schematic diagrams of a switch in a free tripping state. As shown in FIG. 23, when receiving a switch-off signal of the power supply system, the trip unit opens TX, and further unlocks MY, so that the tripping fastener DCH rotates, in a counterclockwise manner, to complete free tripping. In this case, the movable contact has completed switch-off to a maximum open-distance position, and a free tripping process is completed at this moment. In this case, OE further indicates a switch-on position. As shown in FIG. 23, due to the pulling force of the spring GB, a counterclockwise torque is generated for GE Because GF and FK are rigidly coupled, under the connection of four-connecting rod FK-KE-EO, OE is reset to the switch-off position shown in FIG. 24. In this case, a position of the contact is correctly indicated. Due to the connection of four-connecting rod FK KE EO, when GF rod rotates at a relatively small angle in a counterclockwise manner, OE rod may move at a relatively large angle. Therefore, OE in FIG. 24 has an apparent angle difference from OE in FIG. 23, and provides a relatively clear tripping indication for maintenance personnel.

The process of resetting from the free tripping state is as follows: As shown in FIG. 24, when OE in the four-connecting rod OE-EK-KF is driven to rotate in a counterclockwise manner, because KF and GK are rigidly coupled, and GS and GF are also rigidly coupled, GS may press down the cradle HCD, and drive the HCD to rotate to the lock MY in a counterclockwise manner, as shown in FIG. 19.

In the embodiments, the power mechanism may be disposed. The first linkage structure may be connected between the knob connector and the transmission element, the second linkage structure may be connected between the transmission element and the contact connector, and the second linkage structure may be connected between the cradle and the contact connector, so that three states of the switch may be implemented: a manual switch-off state, a manual switch-on state, and an automatic tripping state. In addition, the knob connector of the switch provided has apparent and easy-to-identify position indications in the three states. Referring to FIG. 6, an angle at which the knob rotates between the first position P1 and the second position P2 may be 90 degrees, or may be close to 90 degrees ("close to 90 degrees" may be understood as a range of about 90 degrees, for example, a range from 75 degrees to 105 degrees), an angle at which the knob rotates between the third position P3 and the first position P1 is greater than or equal to a preset value, and an angle at which the knob rotates between the third position P3 and the second position P2 is also greater than or equal to the preset value. A purpose of setting the preset value herein is to meet that the third position P3 and the first position P1 are easily distinguished by naked eyes, and the third position P3 and the second position P2 are easily distinguished by naked eyes. That is, when the switch is in the tripping state, the third position P3 indicated by the knob is easily identified. The preset value may be greater than or equal to 20 degrees, or greater than or equal to 30 degrees. In an implementation, the preset value may be from 40 degrees to 50 degrees. The knob of the switch may rotate at a large angle, so that a state of the switch may be easily identified by naked eyes. In an automatic tripping state, the knob may also be located at an apparent position, and therefore, a state of the switch may be easily identified. In this solution, a large angle indication of the knob is limited, which is easy to identify, facilitates observation of a switch status, and easily detects problems such as a slight fusion welding and a switch-off failure of a contact. A transmission element in a power mechanism in a second implementation may be described as follows.

Figure 25:
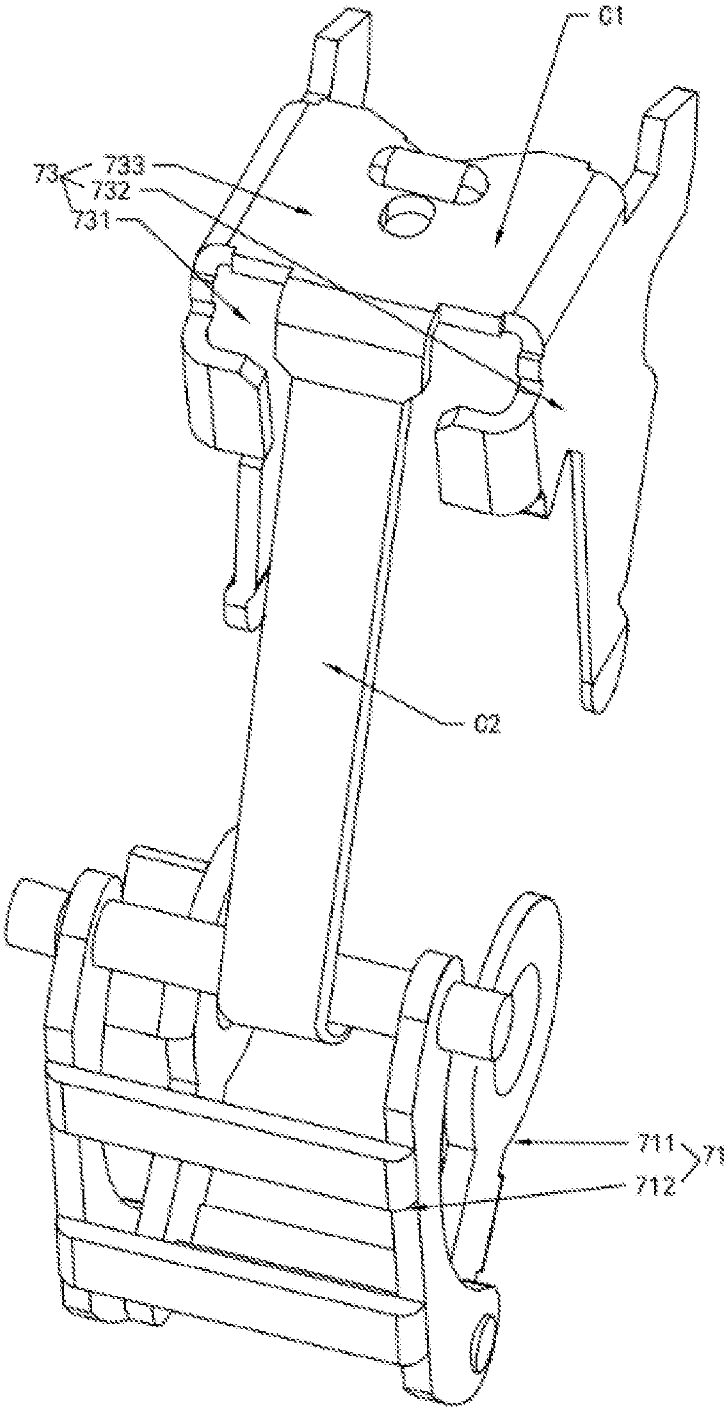
FIG. 25 is a schematic diagram of a transmission element and a first linkage structure in a power mechanism according to a second implementation.

Referring to FIG. 25, a transmission element 73 includes a first arm 731, a second arm 732, and an intermediate arm 733. The first arm 731 and the second arm 732 are oppositely spaced, and the intermediate arm 733 is fastened between the first arm 731 and the second arm 732. The first arm 731 is rotatively connected to a first plate 611, the second arm 732 is rotatively connected to a second plate 612, and the intermediate arm 733 is configured to be rotatively connected to a first connecting rod structure 712 of a first linkage structure 71. The intermediate arm 733 includes an intermediate main body C1 and an intermediate connecting rod C2, and the two are fastened to form an integrated structure. The intermediate body C1 is connected between an edge of the first arm 731 and an edge of the second arm 732, the intermediate connecting rod C2 is located between the first arm 731 and the second arm 732, and the intermediate connecting rod C2 extends from the intermediate body C1 toward the first connecting rod structure 712. An end that is of the intermediate connecting rod C2 and that is away from the intermediate main body C1 is rotatively connected to the first connecting rod structure 712. The first linkage structure 71 in this implementation is the same as the first linkage structure of the power mechanism provided in the first implementation, and the first rotation structure 711 and the first connecting rod structure 712 are both the same as the first rotation structure and the first connecting rod structure corresponding to the first implementation. A difference between this implementation and the first implementation lies in a connection structure between the transmission element and the first linkage structure 71. In this implementation, force of the first linkage structure 71 on the transmission element 73 acts on the intermediate arm 733, so that structures of the first arm 731 and the second arm 732 are simpler than corresponding structures in the first implementation, so that an overall structure of the power mechanism is compact, and a size may be smaller. However, in the first implementation, the force of the first linkage structure on the transmission element acts on the first arm 731 and the second arm 732, to ensure balance of force application.

A transmission element and a first linkage structure of the power mechanism in a third implementation may be described as follows.

Figure 26:
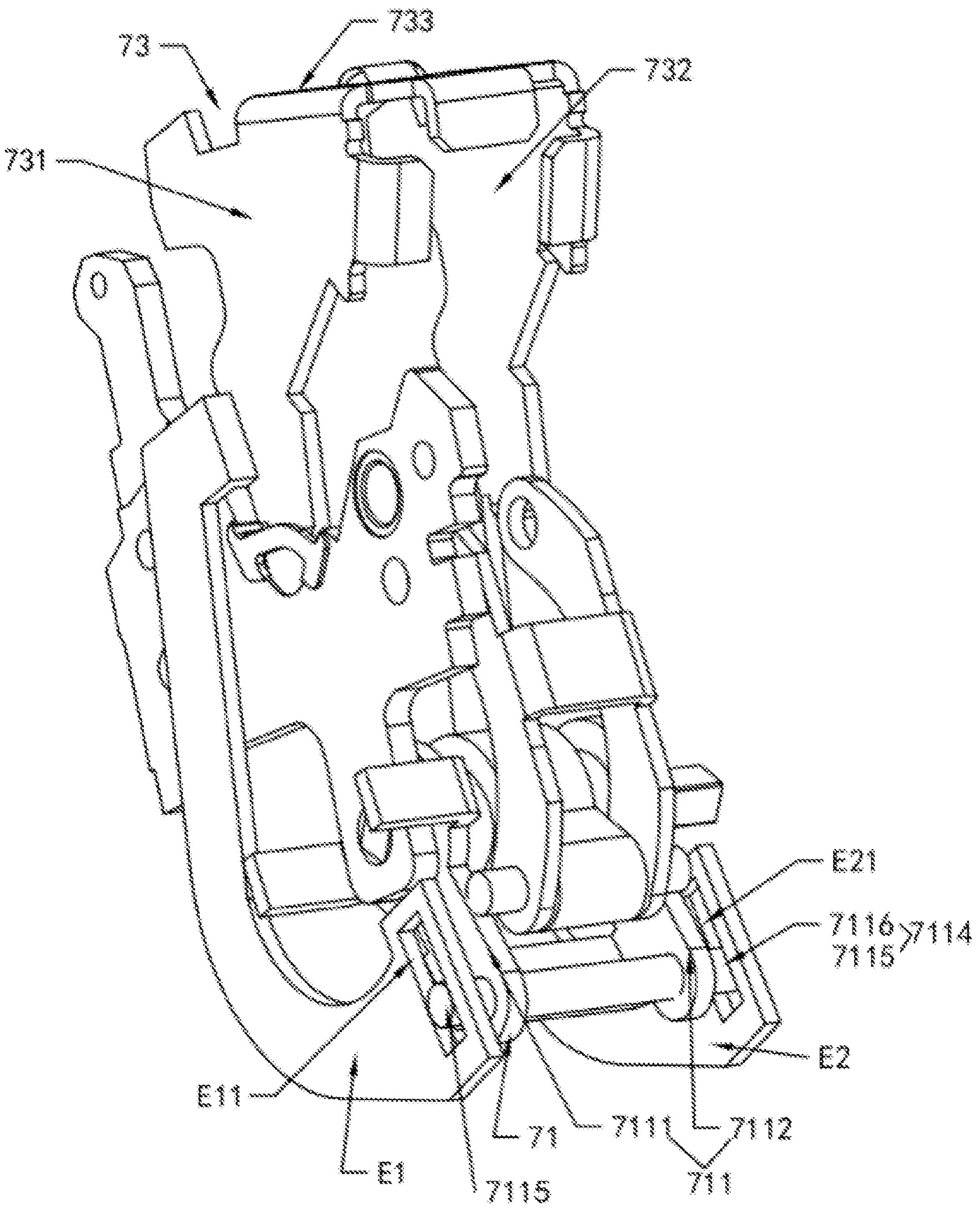
FIG. 26 is a schematic diagram of a transmission element and a first linkage structure in a power mechanism according to a third implementation.
Figure 27:
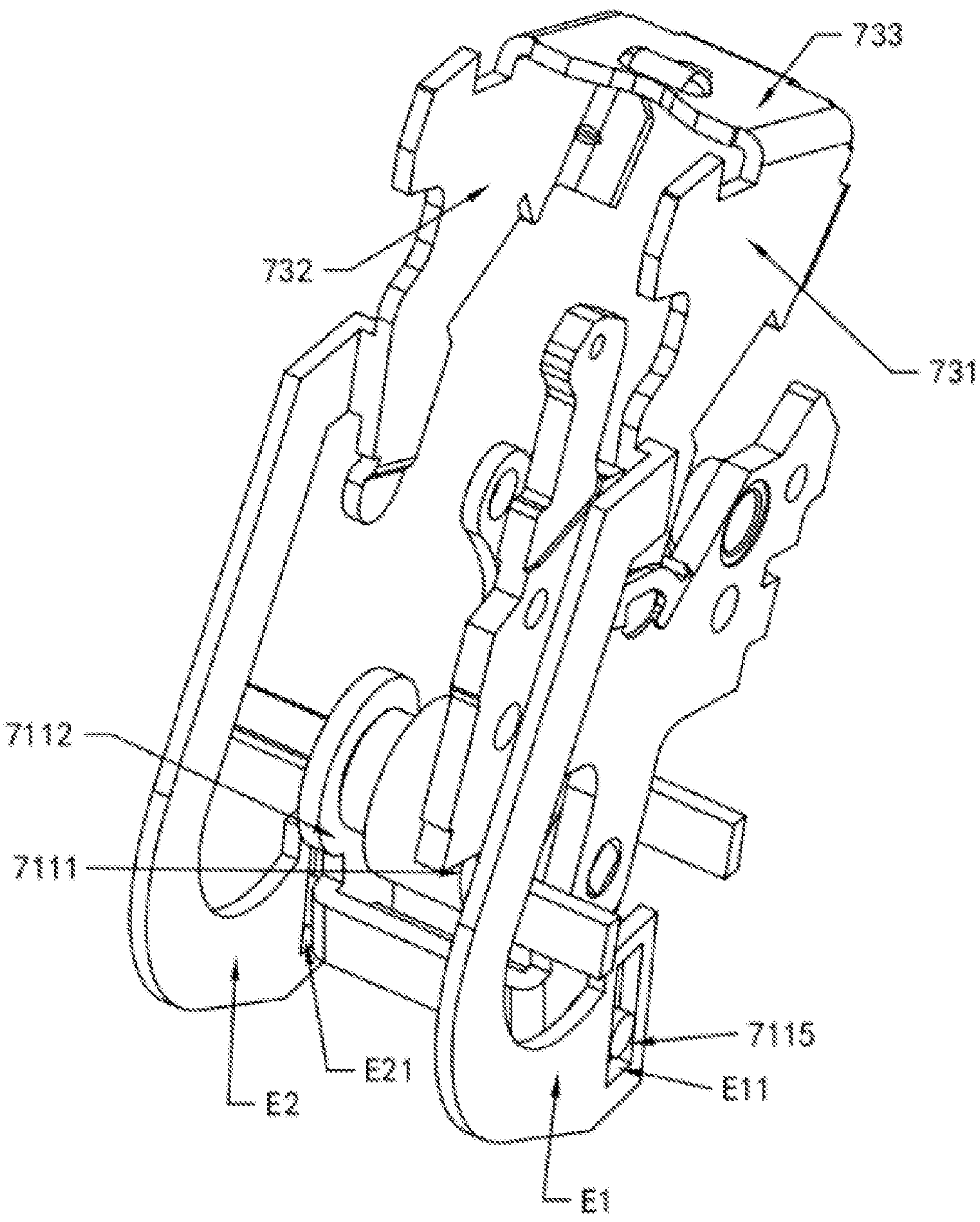
FIG. 27 is a schematic diagram of a transmission element and a first linkage structure in a power mechanism according to a third implementation.

Referring to FIG. 26 and FIG. 27, a difference between the third implementation and the first implementation lies in that: In the third implementation, a structure of the transmission element 73 may be different from that of the first linkage structure 71, the first linkage structure 71 may include only the first rotation structure 711, and the first rotation structure 711 and the transmission element 73 may be slidingly connected, to drive, by rotating the knob, the transmission element to rotate relative to the fastening bracket. The transmission element 73 includes a first arm 731, a first extension part E1, a second arm 732, a second extension part E2, and an intermediate arm 733. The first arm 731 and the second arm 732 are oppositely spaced, the intermediate arm 733 is fastened between the first arm 731 and the second arm 732, the first arm 731 is rotatively connected to the first plate 611, and the second arm 732 is rotatively connected to the second plate 612. The intermediate arm 733 is configured to be connected to the second linkage structure 72 by using an elastic element, one end of the first extension part E1 is fastened to the first arm 731, and the other end of the first extension part E1 is located on a side that is of the first part 7111 and that is away from the second part 7112 of the first rotation structure 711, and is slidingly connected to the first rotation structure 711. One end of the second extension part E2 is fastened to the second arm 732, and the other end of the second extension part E2 is located on a side that is of the second part 7112 of the first rotation structure 711 and that is away from the first part 7111, and is slidingly connected to the second rotation structure 721.

The first rotation structure 711 includes a sliding rod 7114. The sliding rod 7114 is fastened to the first part 7111 and the second part 7112. The sliding rod 7114 includes a first sliding part 7115 and a second sliding part 7116. The first sliding part 7115 is located on a side that is of the first part 7111 and that is away from the second part 7112, and the second sliding part 7116 is located on a side that is of the second part 7112 and that is away from the first part 7111. The first extending part E1 is provided with a first sliding slot E11, the first sliding slot E11 cooperates with the first sliding part 7115, the second extending part E2 is provided with a second sliding slot E21, and the second sliding slot E21 cooperates with the second sliding part 7116, to implement a sliding connection between the first rotation structure 711 and the transmission element 73, to drive, by rotating the knob, the transmission element to rotate relative to the fastening bracket.

Operating principles of the power mechanism provided in the second implementation and the third implementation are the same as the operating principle of the power mechanism provided in the first implementation, and details are not described again.

In conclusion, the foregoing embodiments are merely intended for describing, but are not limiting. Although described in detail with reference to the foregoing embodiments, a person of ordinary skill in the art should understand that modifications may still be made without departing from the scope of the embodiments.

What is claimed is:

1. A power supply system, comprising:

a control unit;

a switch;

a direct current (DC) power source; and a power conversion unit, wherein the switch is electrically connected between the direct current source and the power conversion unit, the control unit is configured to send a switch-off signal to the switch, the switch comprises a contact component, a knob, and a power mechanism connected between the contact component and the knob, and the contact component comprises a movable contact and a static contact that can be switched on or off relative to each other; and the power mechanism comprises a fastening bracket, a knob connector, a contact connector, a transmission component, a trip unit, and a cradle, wherein the knob connector is fastened to the knob, the contact connector is fastened to the movable contact, both the knob connector and the contact connector are rotatively connected to the fastening bracket, rotation centers of the knob connector and the contact connector are collinear, the transmission component is configured to implement power transmission between the knob connector and the contact connector, the cradle is rotatively connected to the fastening bracket, the cradle is connected to the transmission component, the cradle cooperates with the trip unit, the trip unit is configured to receive the switch-off signal, to implement tripping of the trip unit and the cradle, and the movable contact is driven to be separated from the static contact by using the transmission component.

2. The power supply system according to claim 1, wherein the switch has three states: a manual switch-off state, a manual switch-on state, and an automatic tripping state, the knob points to a first position when the switch is in the manual switch-on state, the knob points to a second position when the switch is in the manual switch-off state, the knob points to a third position when the switch is in the automatic tripping state, an angle at which the knob rotates between the third position and the first position is greater than or equal to a preset value, and an angle at which the knob rotates between the third position and the second position is also greater than or equal to the preset value.

3. The power supply system according to claim 2, wherein the preset value is greater than or equal to 20 degrees.

4. The power supply system according to claim 1, wherein the transmission component further comprises:

a first linkage structure;

a second linkage structure; and a transmission element, wherein the transmission element is rotatively connected to the fastening bracket, the first linkage structure is connected between the transmission element and the knob connector, to drive, by rotating the knob, the transmission element to rotate relative to the fastening bracket, and the second linkage structure is connected between the transmission element and the contact connector, to drive, by rotating the transmission element relative to the fastening bracket, the movable contact to move.

5. The power supply system according to claim 4, wherein the fastening bracket further comprises:

a bracket body; and a main shaft fastened to the bracket body, the knob connector is rotatively connected to one end of the main shaft, the contact connector is rotatively connected to an other end of the main shaft, in an axial direction of the main shaft, the contact connector, the bracket body, and the knob connector are sequentially arranged, and a rotation center of the knob connector and a rotation center of the contact connector are both located on a central axis of the main shaft.

6. The power supply system according to claim 5, wherein the bracket body further comprises:

a first plate and a second plate that are disposed opposite to each other, the main shaft passes through the first plate and the second plate, the knob connector is rotatively connected to one end of the main shaft, the contact connector is rotatively connected to the other end of the main shaft, a part of the first linkage structure is located between the first plate and the second plate, is sleeved on a periphery of the main shaft, is rotatively connected to the fastening bracket, and is fastened to the knob connector.

7. The power supply system according to claim 6, wherein the first linkage structure further comprises:

a first rotation structure that comprises a first part and a second part that are oppositely spaced and fastened to each other, the first part is sleeved on the periphery of the main shaft and adjacent to the first plate, the first part is fastened to the knob connector, the second part is sleeved on the periphery of the main shaft and adjacent to the second plate, an area between the first part and the second part is configured to accommodate a part of the second linkage structure, and the first rotation structure is movably connected to the transmission element, to drive, by rotating the knob, the transmission element to rotate relative to the fastening bracket.

8. The power supply system according to claim 7, wherein the part of the second linkage structure is located between the first plate and the second plate, is located between the first part and the second part, is rotatively connected to the main shaft, and is fastened to the contact connector.

9. The power supply system according to claim 8, wherein the second linkage structure further comprises:

a second rotation structure; and a second connecting rod structure, the second rotation structure comprises an intermediate sleeve and a first bump and a second bump that are protrudingly disposed on an outer surface of the intermediate sleeve, the intermediate sleeve is sleeved on the main shaft and is located between the first part and the second part, the first bump and the contact connector are fastened by using a fastened pin, the fastened pin and an outer side surface of the second part of the first rotation structure are disposed at an interval, the outer side surface is a surface that is of the second part and that is away from the main shaft in a radial direction of the main shaft, the second bump is rotatively connected to one end of the second connecting rod structure, and the second connecting rod structure is located between the first plate and the second plate and is configured to connect to the transmission element.

10. The power supply system according to claim 7, wherein the first rotation structure is slidingly connected to the transmission element, to drive, by rotating the knob, the transmission element to rotate relative to the fastening bracket.

11. The power supply system according to claim 10, wherein the transmission element further comprises:

a first arm;

a first extension part;

a second arm;

a second extension part; and an intermediate arm, the first arm and the second arm are oppositely spaced, the intermediate arm is fastened between the first arm and the second arm, the first arm is rotatively connected to the first plate, the second arm is rotatively connected to the second plate, the intermediate arm is configured to connect to the second linkage structure by using an elastic element, one end of the first extension part is fastened to the first arm, an other end of the first extension part is located on a side that is of the first part of the first rotation structure and that is away from the second part of the first rotation structure, and is slidingly connected to the first rotation structure, one end of the second extension part is fastened to the second arm, and an other end of the second extension part is located on a side that is of the second part of the first rotation structure and that is away from the first part of the first rotation structure, and is slidingly connected to the first rotation structure.

12. The power supply system according to claim 11, wherein the first rotation structure further comprises:

a sliding rod fastened to the first part and the second part, the sliding rod comprises a first sliding part and a second sliding part, the first sliding part is located on a side that is of the first part and that is away from the second part, the second sliding part is located on a side that is of the second part and that is away from the first part, a first sliding slot is disposed on the first extension part, the first sliding slot cooperates with the first sliding part, a second sliding slot is disposed on the second extension part, and the second sliding slot cooperates with the second sliding part, to implement a sliding connection between the first rotation structure and the transmission element.

13. The power supply system according to claim 7, wherein the first linkage structure further comprises:

a first connecting rod structure that is movably connected to the transmission element by using the first connecting rod structure, one end of the first connecting rod structure is rotatively connected to the first rotation structure, and an other end of the first connecting rod structure is rotatively connected to the transmission element.

14. The power supply system according to claim 13, wherein the transmission element further comprises:

a first arm;

a second arm; and an intermediate arm, the first arm and the second arm are oppositely spaced, the intermediate arm is fastened between the first arm and the second arm, the first arm is rotatively connected to the first plate, the second arm is rotatively connected to the second plate, and the intermediate arm is configured to rotatively connect to the first connecting rod structure.

15. The power supply system according to claim 13, wherein the transmission element further comprises:

a first arm;

a second arm; and an intermediate arm, the first arm and the second arm are oppositely spaced, the intermediate arm is fastened between the first arm and the second arm, the first arm is rotatively connected to the first plate, the second arm is rotatively connected to the second plate, and the intermediate arm is configured to connect to the second linkage structure by using an elastic element; and the first connecting rod structure comprises a first rod and a second rod, wherein the first rod and the second rod are oppositely spaced and fastened, one end of the first rod is rotatively connected to the first part, an other end of the first rod is rotatively connected to the first arm, one end of the second rod is rotatively connected to the second part, and an other end of the second rod is rotatively connected to the second arm.

16. The power supply system according to claim 15, wherein the first arm further comprises:

a first main arm; and a first branch arm, the first main arm is rotatively connected to the first plate, one end of the first branch arm is fastened to the first main arm, an other end of the first branch arm is rotatively connected to the first rod, the second arm comprises a second main arm and a second branch arm, the second main arm is rotatively connected to the second plate, one end of the second branch arm is fastened to the second main arm, an other end of the second branch arm is rotatively connected to the second rod, the first branch arm is located on an outer side the first plate, and the second branch arm is located on an outer side of the second plate.

17. The power supply system according to claim 16, wherein a part that is of the first main arm and that is rotatively connected to the first plate is located on an inner side of the first plate, and a part that is of the second main arm and that is rotatively connected to the second plate is located on an inner side of the second plate.

18. A power mechanism, applied to a switch and configured to drive a movable contact and a static contact of the switch to be switched on or off, the power mechanism comprising:

a fastening bracket;

a knob connector;

a contact connector; and a transmission element, wherein the knob connector, the contact connector, and the transmission element are all rotatively connected to the fastening bracket, the knob connector is configured to fasten a knob, the contact connector is configured to fasten the movable contact, a rotation center of the knob connector is a first axis, a rotation center of the contact connector is a second axis, and the first axis and the second axis are collinear;

a first linkage structure, connected between the transmission element and the knob connector, to drive, by rotating the knob, the transmission element to rotate relative to the fastening bracket; and a second linkage structure, connected between the transmission element and the contact connector, to drive, by rotating the transmission element relative to the fastening bracket, the movable contact to move.

19. The power mechanism according to claim 18, wherein the fastening bracket further comprises:

a bracket body; and a main shaft fastened to the bracket body, the knob connector is rotatively connected to one end of the main shaft, the contact connector is rotatively connected to an other end of the main shaft, in an axial direction of the main shaft, the contact connector, the bracket body, and the knob connector are sequentially arranged, and both the first axis and the second axis are located on a central axis of the main shaft.

20. The power mechanism according to claim 19, wherein the bracket body further comprises:

a first plate and a second plate that are disposed opposite to each other, the main shaft passes through the first plate and the second plate, the knob connector is rotatively connected to one end of the main shaft, the contact connector is rotatively connected to the other end of the main shaft, a part of the first linkage structure is located between the first plate and the second plate, is sleeved on a periphery of the main shaft, is rotatively connected to the fastening bracket, and is fastened to the knob connector.

* * * * *